US012708074B2

(12) United States Patent
Mayerle

(10) Patent No.: US 12,708,074 B2
(45) Date of Patent: Aug. 18, 2026

(54) WEED SEED DESTRUCTION ON A COMBINE HARVESTER

(71) Applicant: TRITANA INTELLECTUAL PROPERTY LTD., Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 546 days.

(21) Appl. No.: 18/170,126

(22) Filed: Feb. 16, 2023

(65) Prior Publication Data

US 2023/0210057 A1 Jul. 6, 2023

Related U.S. Application Data

(63) Continuation-in-part of application No. 17/738,132, filed on May 6, 2022, now Pat. No. 12,457,940, and a continuation-in-part of application No. 16/817,190, filed on Mar. 12, 2020, now Pat. No. 11,666,001.

(60) Provisional application No. 63/322,735, filed on Mar. 23, 2022, provisional application No. 63/310,759, filed on Feb. 16, 2022, provisional application No. 63/227,575, filed on Jul. 30, 2021, provisional application No. 62/818,417, filed on Mar. 14, 2019.

(51) Int. Cl.
*A01F 12/40* (2006.01)
*A01D 41/12* (2006.01)

(52) U.S. Cl.
CPC .......... *A01F 12/40* (2013.01); *A01D 41/1243* (2013.01)

(58) Field of Classification Search
CPC ............................ A01F 12/40; A01D 41/1243
See application file for complete search history.

(56) References Cited

U.S. PATENT DOCUMENTS 1,301,316 A * 4/1919 Plaisted .................. B02C 13/28 241/194
2,064,689 A 12/1936 Russwurm
2,557,865 A 6/1951 Emmanouilidis
2,775,174 A 12/1956 Petrick
3,071,246 A 1/1963 Schimke
3,448,933 A 6/1969 Roy
(Continued)

FOREIGN PATENT DOCUMENTS

AU A-37966/95 5/1996
AU 200138781 10/2001
(Continued)

*Primary Examiner* — Arpad Fabian-Kovacs
(74) *Attorney, Agent, or Firm* — Adrian D. Battison; Ryan W. Dupuis; Ade & Company Inc.

(57) ABSTRACT

A combine harvester separates crop into straw and chaff and weed seeds using a sieve, a chopping rotor with a spreading device and at least one weed seed devitalization section. The components can be operated in a first mode where both the first material and said second material are directed to the chopper and a second mode the first material is directed to the chopper inlet and the second material is directed to the WSD. This can be effected by providing a guide wall which has a leading edge attached adjacent a rear edge of the sieve and extends rearwardly therefrom. The chopper and the WSD can also be moved to provide the change of modes. A construction of destructor mill with an outer stator on the housing is also disclosed along with a method of feeding the lost grain to the WSD.

15 Claims, 13 Drawing Sheets

(56) References Cited

U.S. PATENT DOCUMENTS 3,670,739 A * 6/1972 Rowland-Hill .......... A01F 7/06 241/49
3,894,695 A 7/1975 Benedikter
4,087,051 A * 5/1978 Moeller ................ B02C 18/067 241/27
4,591,102 A 5/1986 Clarke
4,637,406 A 1/1987 Guinn
4,711,253 A 12/1987 Anderson
4,917,652 A 4/1990 Glaubitz
4,923,431 A 5/1990 Miller
5,425,507 A 6/1995 Stumpff
5,556,042 A 9/1996 Roberg
5,944,604 A 8/1999 Niermann
5,976,011 A * 11/1999 Hartman ................ A01F 12/40 460/111
6,251,009 B1 * 6/2001 Grywacheski .......... A01F 12/40 56/504
6,500,064 B1 12/2002 Schrattenecker
6,547,169 B1 4/2003 Matousek
6,656,038 B1 12/2003 Persson
6,685,558 B2 2/2004 Niermann
6,840,854 B2 1/2005 Redekop
6,908,379 B2 6/2005 Gryspeerdt
8,152,610 B2 4/2012 Harrington
8,167,691 B2 5/2012 Pohlmann
8,210,915 B2 7/2012 Holmen
8,789,785 B2 7/2014 Lelas
9,497,903 B2 11/2016 Biggerstaff
9,635,813 B2 5/2017 Dilts
9,686,916 B2 6/2017 Biggerstaff
9,723,790 B2 8/2017 Berry
9,730,390 B2 8/2017 Maes
9,949,434 B2 4/2018 Baes
10,004,176 B2 6/2018 Mayerle
10,653,069 B2 5/2020 Farley
10,986,778 B2 4/2021 Company
11,950,528 B2 * 4/2024 Van De Wege ......... A01F 12/40
12,201,988 B2 * 1/2025 Berry .................. B02C 13/1835
2003/0003974 A1 1/2003 Niermann
2003/0114207 A1 6/2003 Wolters
2004/0132517 A1 7/2004 Weihholdt
2005/0277454 A1 12/2005 Couture
2005/0282602 A1 * 12/2005 Redekop ................ A01F 12/40 460/112
2010/0291985 A1 11/2010 Pohimann
2011/0059782 A1 3/2011 Harrington
2014/0364179 A1 12/2014 Brinkmann
2015/0373913 A1 12/2015 Berry
2016/0044869 A1 2/2016 Mayerle
2016/0044870 A1 2/2016 Mayerle
2016/0113202 A1 4/2016 Mayerle
2016/0150727 A1 6/2016 Mayerle
2016/0150728 A1 6/2016 Duquesne
2017/0079207 A1 3/2017 Puryk
2017/0238463 A1 8/2017 Van de Wege
2018/0070534 A1 3/2018 Mayerle
2018/0249641 A1 9/2018 Lewis
2018/0317392 A1 11/2018 Mayerle
2018/0368319 A1 12/2018 Desmet
2019/0174677 A1 * 6/2019 Ricketts .................. A01F 12/20
2019/0200533 A1 * 7/2019 Mayerle ................. A01D 69/00
2020/0107502 A1 * 4/2020 Mayerle ............ A01D 41/1243
2020/0296896 A1 9/2020 Mayerle
2021/0022289 A1 1/2021 Berry
2021/0282329 A1 9/2021 Hall
2022/0008889 A1 1/2022 Jackson

FOREIGN PATENT DOCUMENTS

AU 771302 B2 * 3/2004 ............ A01D 41/12
AU 2017228663 10/2017
AU 2018100350 5/2018
AU 2018208623 A1 * 8/2018 ............ A01D 41/12
AU 2019202177 10/2019
AU 2014218502 8/2023
CA 2470876 C * 12/2009 ............ A01F 12/40
CN 20244482 9/2012
DE 382632 10/1923
DE 19906524 8/2000
DE 102006040255 4/2007
DE 102009042002 3/2011
DE 102011088512 1/2013
DE 102018131432 6/2020
EP 1027820 8/2000
EP 1191835 4/2002
EP 1442649 8/2004
EP 1905291 4/2008
EP 2976937 1/2016
EP 3520596 8/2019
GB 1062209 3/1967
WO WO 01/01754 1/2001
WO WO-2008156419 12/2008
WO WO-2009100500 8/2009
WO WO-2014127408 8/2014
WO WO2017/008161 1/2017
WO WO2018/053600 3/2018
WO WO2019178651 9/2019
WO WO-2020160622 8/2020
WO WO2020/181385 9/2020

* cited by examiner 2
10
11
12
13
14
15
16
17
20
21
23
23
23
26
27
28
29
50
54
56
58
59
60
61
121
122

1
2
10
11
12
13
14
16
17
18
20
21
23
24
28
29
54
56
58
59
60
61
121
122
171

28
17
171
52
61
55
63
62
16
122
121
15
11
12
13

28
29
26
38
491
51
521
49
21
31
56
54
171
55
53
52
51
32
54
56
50
23
57
30
22
25
27
17
11
22

28
29
17
24
26
20
26
18
19
23
70
23
56
171
54
88
90
52
89
55
83
82
84
79
81
16
75
11
12

28
17
27
171
54
52
541
90
88
711
89
82
75
81
83
84
55
121
12

71
72
87
86
88
80
77
90
79
78
75
70
76
71

WEED SEED DESTRUCTION ON A COMBINE HARVESTER

This invention relates to a combine harvester including a weed seed destructor section in combination with a straw chopper so that weed seeds in the discharged chaff can be devitalized before being spread onto the ground.

BACKGROUND OF THE INVENTION

Recent developments in combine harvesters have been directed to provide a residue management system designed both to kill weed seeds and to distribute the harvest residue back over a combine's entire cutting width in an even and consistent manner.

In U.S. Pat. No. 10,004,176 published Jun. 26, 2018 and US Publication 2018/0070534 published Mar. 15, 2018 there is disclosed an arrangement in which weed seeds are destroyed in the chaff from a combine harvester by a rotary mill causing repeated high-speed impacts by a rotor including a center blade section and a plurality of coaxial rings of rotor members or pins which accelerate the discarded seeds in a direction centrifugally away from the rotor onto a stator including coaxial rings of stator surfaces around the axis. Thus the discarded seeds rebound back and forth between the rotor components and the stator components to provide a plurality of impacts.

Also in U.S. Pat. No. 10,492,369 (Mayerle) is disclosed a weed seed destructor (WSD) with a moveable chaff guide wall or a dividing chaff door mounted on the chopper housing and extending forwardly therefrom toward the sieve. This is movable by pivoting about a transverse axis at the front of the chopper section to provide change from a first chopper only mode, where the straw and the chaff containing the weed seeds are all directed into the straw chopper for spreading, to a second chopper and destructor mode, where the straw is fed to the chopper and the chaff and weed seeds are fed to the WSD. The same patent also discloses an arrangement in which the WSD and typically both the WSD and the chopper in a common unit or assembly can slide rearwardly of the combine for access to the separation system, primarily the sieve, of the combine harvester. This can provide a space between the inlet to the WSD and the sieve which can allow a user or operator to enter the space between to allow service or adjustment of the sieve.

Another system, described in US application 2020/0296896 published Sep. 24, 2020 by the present Applicant (corresponding to PCT Publication 2020/181,385), provides an improved weed seed destructor (WSD) that includes destructor mills mounted co-axially relative to or directly on a transverse shaft of the straw management system, typically the straw chopper, and works well with a traditional straw chopping system.

A yet further system, described in PCT published application 2023/004494 published Feb. 2 2023 by the present Applicant, provides a further weed seed destructor (WSD) that includes destructor mills divided into two separate sections with one section operating on the chaff in advance of the other.

The disclosures of each of the above cited patents are incorporated herein by reference or may be referenced for the further detail disclosed.

Typically therefore two operating modes are provided, where in a first mode or operating position all material is fed to the straw chopper and in a second mode or operating position the straw is fed to the straw chopper and the chaff and weed seeds are fed to the destructor section. In some systems the conversion between the modes requires a significant down time to the operator, thus reductions to this time allows for greater harvest efficiency.

Some problems with existing technology which include:

a—A significant amount of time is required to change between the above modes with competitive systems. This is down time to the operator, thus reductions to this time allows for greater harvest efficiency.

b—Combines that do not provide a sufficient longitudinal separation distance between the rear of the sieves and the straw hood, where the chopper is mounted, create difficult geometry to mount a WSD section along with the chopper section. When this distance is reduced the downward incline angle of the above-described movable dividing chaff door between the two sections is reduced making it problematic for the straw residue to flow consistently into the chopper section, especially when the chaff or straw residue is green and wet. This can cause blockages to occur across the dividing chaff door.

SUMMARY OF THE INVENTION

According to a first aspect of the invention there is provided a combine harvester comprising:

a separation system for separating harvested crop into grain, a first material comprising straw at a first location and a second material comprising chaff and weed seeds at a second location;

the separation system including at least one sieve which separates the grain which falls through the sieve from the second material comprising the chaff and weed seeds which passes over the sieve to the second location;

a chopping rotor having a chopper inlet for receiving the first material and a spreading device for spreading the first material from the straw chopping rotor at least to the sides of the harvester;

and at least one weed seed destructor section comprising an inlet arrangement to receive the second material and at least one weed seed destructor for receiving the second material and for causing devitalization of the weed seeds therein;

a guide wall engaging and directing at least the second material and movable to change between first and second operating modes, where:

in the first mode both the first material and said second material are directed to the chopper inlet, and in the second mode the first material is directed to the chopper inlet and the second material is directed to said inlet arrangement of the weed seed destructor section;

wherein the guide wall has a leading edge attached at or adjacent a rear edge of the sieve and extends rearwardly therefrom.

In one important optional feature which can be used with any aspect of the invention herein, the guide wall is pivotal about the leading edge.

In one important optional feature which can be used with any aspect of the invention herein, the guide wall is releasably pinned in each of its positions.

In one important optional feature which can be used with any aspect of the invention herein, the guide wall, because it pivots at the leading edge may be actuated to move between positions while harvesting such that an operator or a predetermined electronic weed map can turn on or off residue flow to the weed destructor as desired.

In one important optional feature which can be used with any aspect of the invention herein, the sieve includes a main body with a rear edge of the main body and a sieve extension portion extending rearwardly from the rear edge and wherein the guide wall is mounted with leading edge attached to the sieve extension portion. Thus it reciprocates or shakes back and forth with the sieve to assist in moving the material rearwardly.

In one important optional feature which can be used with any aspect of the invention herein, the housing of the weed seed destructor section has a feed section with an entrance opening at least partly across the sieve with a leading edge of the entrance opening and a trailing edge of the entrance opening and wherein the guide wall pivots so that a rear edge thereof is located at the trailing edge in the first mode to direct the second material into the chopping rotor and so that a rear edge thereof is located at the leading edge in the second mode to direct the second material into the feed section of the weed seed destructor section.

In one important optional feature which can be used with any aspect of the invention herein, the chopping rotor is moveable relative to the combine harvester in conjunction with movement of said at least one weed seed destructor section and wherein the chopping rotor is connected to said at least one weed seed destructor section for common movement therewith.

In one important optional feature which can be used with any aspect of the invention herein, the weed seed destructor section is movable in a direction upwardly and rearwardly of the combine harvester.

In one important optional feature which can be used with any aspect of the invention herein, the weed seed destructor includes a destructor mill with a stator and rotor causing impacts on the seeds in the mill. However other types of destructor can be used.

In one important optional feature which can be used with any aspect of the invention herein, the destructor mill is mounted on a shaft of the chopping rotor for common rotation therewith. The one weed seed destructor can comprise a first and a second weed seed destructor mill each mounted on a respective end of a shaft of the chopping rotor for common rotation therewith.

In one important optional feature which can be used with any aspect of the invention herein, the weed seed destruction section comprises:

- a feed section of the housing mounted at the second location at the rear of the sieve;
- a horizontal transfer member extending along the feed section of the housing across the combine harvester mounted for rotation about a longitudinal axis, the horizontal transfer member being shaped to carry the second material containing the chaff and weed seeds along the feed section of the housing;
- wherein the second material containing the chaff and weed seeds is transferred to a location for said devitalization.

In one important optional feature which can be used with any aspect of the invention herein, the method includes collecting grain which is unseparated by the sieve in a grain loss section at a rear end of the sieve and transferring the collected grain from the grain loss section to said at least one weed seed destructor section so that devitalization of the collected grain is also caused so as to reduce a number of the grains that can germinate, as opposed to current systems where the mill is shut off and the grain is spilled on the ground.

In this arrangement, preferably the seed destructor section includes a drive disengagement feature to halt said devitalization such that the grain from the grain loss sensor section can be collected for inspection.

Preferably in this arrangement, the sieve includes a main body with a rear edge of the main body and a sieve extension portion extending rearwardly from the rear edge and wherein the grain loss section is mounted underneath the sieve extension portion.

According to a second aspect of the invention there is provided a method of harvesting using a combine harvester comprising:

- a separation system for separating harvested crop into grain, a first material comprising straw at a first location and a second material comprising chaff and weed seeds at a second location;
- the separation system including at least one sieve which separates the grain which falls through the sieve from the second material comprising the chaff and weed seeds which passes over the sieve to the second location;
- a chopping rotor for receiving the first material and a spreading device for spreading the first material from the straw chopping rotor at least to the sides of the harvester;
- and at least one weed seed destructor section comprising an inlet arrangement to receive the second material and at least one weed seed destructor for receiving the second material and for causing devitalization of the weed seeds therein;
- the method comprising:
- operating the chopping rotor and said at least one weed seed destructor section in a first operating mode in which both the first material and said second material is directed to the chopping rotor,
- operating the chopping rotor and said at least one weed seed destructor section in second mode in which the first material is directed to the chopper inlet and the second material is directed to the inlet arrangement of the weed seed destructor section; collecting grain which is unseparated by the sieve in a grain loss section at a rear end of the sieve;
- and, while operating in the first mode, transferring the collected grain from the grain loss section to said at least one weed seed destructor section so that devitalization of the collected grain is also caused so as to reduce a number of the grains that can germinate.

That is, an additional feature of the invention as defined above is that the collecting grain in the grain loss collection system is typically spread back over the field with the residue and hence will germinate in the next season often as an undesirable weed in another crop. The present arrangement ensures that the grain which is unseparated and thus fed to the grain loss detector is devitalized with weed seeds rather than allowed to germinate.

Preferably in this aspect, the seed destructor section includes a drive disengagement feature to halt said devitalization such that the grain from the grain loss sensor section can be collected for inspection.

Preferably in this arrangement, the sieve includes a main body with a rear edge of the main body and a sieve extension portion extending rearwardly from the rear edge and wherein the grain loss section is mounted underneath the sieve extension portion.

In one important optional feature which can be used with any aspect of the invention herein, the chopping rotor is also moveable relative to the combine harvester in conjunction with movement of the weed seed destructor section.

In one important optional feature, the chopping rotor is connected to the weed seed destructor section for common movement therewith.

In one important optional feature, the chopping rotor is moveable relative to the combine harvester between the first operating and second access position.

In one important optional feature, the weed seed destructor section, with optionally the chopper rotor, is movable in a direction upwardly and rearwardly of the combine harvester. The weed seed destructor section is supported on the combine harvester in both the operating position and the access position.

In one important optional feature, the movement of said at least one weed seed destructor section is in a linear direction such as on guide slides so as to be movable along a guide track in a direction longitudinal to the combine harvester.

In one important optional feature, the chopping rotor and the weed seed destructor section comprise components of a common assembly having a common frame and/or common housing.

The arrangement herein can be used with a conventional mill construction where the weed seed destructor section comprises two rotors each having an upstanding axis of rotation with the two rotors arranged side by side across the combine harvester.

Alternatively the arrangement can be used with vertical mill construction where the weed seed destructor section comprises a separate horizontal shaft with an axis of rotation transverse to the direction of travel with rotors arranged on the horizontal axis.

Alternatively the WSD can remain fixed and only the chopper section moves up for access.

Alternatively the WSD including the guide door and the dividing wall can be rotationally or pivotally moved downwardly to optimize the passage of straw and chaff in each mode.

However more preferably in one important optional feature, the weed seed destructor mill is mounted on a shaft of the chopping rotor for common rotation therewith.

In one important optional feature, the weed seed destructor mill comprises a first and a second weed seed destructor mill each mounted on a respective end of a shaft of the chopping rotor for common rotation therewith. This arrangement is shown in the above cited published application US 2020/0296896.

In one important optional feature, the weed seed destruction section comprises a housing mounted at the second location, that is at the rear of the sieve, a horizontal transfer member extending along the housing across the combine harvester mounted for rotation about a longitudinal axis, the horizontal transfer member being shaped to carry the second material containing the chaff and weed seeds along the housing outwardly to at least one end of the housing and a transfer arrangement for transferring the second material containing the chaff and weed seeds from said at least one end of the housing to said at least one weed seed destruction section.

This arrangement can be used to simply feed the material from the transfer member into the weed seed destructor sections carried on the chopping rotor shaft using fans at the ends of the transfer member.

Alternatively the weed seed destructor apparatus can include a primary destructor at the ends of the transfer member arranged to receive the second material or a destructor arrangement can be located in the transfer member. This can include a primary rotor mounted for rotation about an axis and including rotor surfaces thereon for engaging and accelerating the second material and a primary stator mounted for engaging the weed seeds in the accelerated second material to cause a plurality of impacts on the weed seeds between the primary rotor and the primary stator. While one or both of the destructors herein can use impacts, the primary can use another modality such as radiation.

The primary destructor can carry out some initial devitalization of the seeds and there is provided a secondary destructor, which can be at the chopping rotor shaft arranged to receive the second material including a secondary rotor mounted for rotation about an axis and including rotor surfaces thereon for engaging and accelerating the second material with a secondary stator mounted for engaging the weed seeds in the accelerated second material to cause a plurality of impacts on the weed seeds between the secondary rotor and the secondary stator. In this arrangement, the primary destructor has a discharge outlet and the secondary destructor has a feed inlet with a transfer arrangement so that at least some of a discharge from the primary destructor is transferred to and enters the feed inlet of the secondary destructor.

In this arrangement preferably the primary rotor and secondary rotor are driven by separate shafts. In this arrangement preferably the primary rotor and secondary rotor rotate about different axes. In this arrangement preferably the primary rotor and secondary rotor have axes parallel and offset and wherein the transfer arrangement carries the discharge from the primary destructor in a direction transverse to the axes. In this arrangement preferably the feed inlet of the secondary destructor feeds said discharge in a direction transverse to a radial plane of the axis of the secondary rotor so as to enter the secondary destructor from one end.

In one important optional feature, the chopping rotor and the weed seed destruction section comprise a common housing with an upper section and a lower section and wherein the guide sheet guiding the second material communicates with a division between the upper and lower sections in the second operating mode and is moved to a bottom of the lower section in the first operating mode.

In one important optional feature, the weed seed destructor section is moveable relative to the combine harvester to a third position separate from said first and second operating positions at which there is a space between the second location and the weed seed destruction section for access to the second location.

According to another aspect of the invention there is provided a combine harvester comprising:

a separation system for separating from harvested crop a first material comprising straw at a first location and a second material comprising chaff and weed seeds at a second location;

a chopping rotor having a chopper inlet for receiving the first material and a spreading device for spreading the first material from the straw chopping rotor at least to the sides of the harvester;

and at least one weed seed destructor section comprising an inlet arrangement to receive the second material and at least one weed seed destructor for receiving the second material and for causing devitalization of the weed seeds therein;

wherein at least one of said chopper inlet and said inlet arrangement is moveable relative to the combine harvester and said first and second locations thereon between first and second operating positions, where:

in the first operating position both the first material and said second material is directed to the spreading device, and in the second operating position the first material is directed to the spreading device and the second material comprising chaff and weed seeds from said second location is directed to said at least one weed seed destructor section.

In one important optional feature, the weed seed destructor mill comprises a rotor and a stator, the rotor comprising an inner blade section and inner and outer coaxial rings of rotor members mounted on a support plate at one end of the mill, the stator comprising two rings of stator members mounted on a support plate at an opposed end of the mill where a first ring of stator members surrounds the inner blade section and a second ring of stator members is located between the inner and outer coaxial rings of rotor members and where the outer coaxial ring of rotor members forms an outer ring of the mill. In this arrangement preferably the outer coaxial ring of rotor members contains longer members than the inner ring with an outer support ring attached thereto such that the outer support ring prevents escape of weed seeds from the outer ring of stator members. In this arrangement preferably there is provided a sealing ring on the rotor plate to prevent escape of weed seeds from the inner ring of stator members.

According to a further aspect of the invention there is provided a weed seed destructor section for a combine harvester comprising a separation system for separating harvested crop into grain, a first material comprising straw at a first location and a second material comprising chaff and weed seeds at a second location;

said weed seed destructor section comprising:

a destructor housing arranged to be mounted on the combine harvester to receive the second material;

a rotor mounted in the housing for rotation about a rotor axis of the housing;

a stator mounted in the housing so as to be held stationary for rotation of the rotor relative to the stator to cause impacts of the weed seeds back and forth between the rotor and the stator;

the rotor comprising an inner rotor portion and an annular rotor ring portion which carries a plurality of rotor surfaces and rotates around the rotor axis outwardly of the inner rotor portion;

the stator comprising an annular stator ring portion which carries a plurality of angularly spaced stator bars and is located outwardly of the inner rotor portion and inwardly of the annular rotor ring portion, each stator bar being spaced from a next so as to allow passage of the second material therebetween;

a discharge opening for discharge of the chaff and the weed seeds after said impacts;

the stator further comprising an outer wall surrounding the rotor guiding the weed seeds exiting outwardly from the rotor to the discharge opening;

the outer wall being shaped with impact surfaces different from a cylindrical surface surrounding the rotor.

In a preferred embodiment, the discharge opening is located at one angular location on the outer wall so that the chaff and weed seeds are discharged outwardly from the rotor axis.

In a preferred embodiment, the outer wall includes a smooth discharge section angularly downstream of said impact surfaces extending to said discharge opening.

In a preferred embodiment, the smooth discharge section is spiral so as to increase in radial distance from the rotor axis as it extends to said discharge opening.

Preferably the inlet is positioned such that the residue is fed into the milt in a direction such that if cannot immediately and directly flow to the outlet. The residue is directed so that it must travel at least 270 degrees around the mill before it is able to exit.

In a preferred embodiment, the outer wall includes planar sections defining said impact surfaces at separate positions around the axis with each of two adjacent planar sections converging to an apex.

In a preferred embodiment, the outer wall includes inwardly projecting abutment surfaces at angularly spaced positions therearound.

According to a further aspect of the invention there is provided a weed seed destructor section for a combine harvester comprising a separation system for separating harvested crop into grain, a first material comprising straw at a first location and a second material comprising chaff and weed seeds at a second location;

said weed seed destructor section comprising:

a destructor housing arranged to be mounted on the combine harvester to receive the second material;

a rotor mounted in the housing for rotation about a rotor axis of the housing;

a stator mounted in the housing so as to be held stationary for rotation of the rotor relative to the stator to cause impacts of the weed seeds back and forth between the rotor and the stator;

the rotor comprising an inner rotor portion and an annular rotor ring portion which carries a plurality of rotor surfaces and rotates around the rotor axis outwardly of the inner rotor portion;

the stator comprising an annular stator ring portion which carries a plurality of angularly spaced stator bars and is located outwardly of the inner rotor portion and inwardly of the annular rotor ring portion, each stator bar being spaced from a next so as to allow passage of the second material therebetween;

the housing including two end walls radial to the rotor axis and an outer wall surrounding the rotor axis;

a discharge opening in the outer wall for discharge of the second material after said impacts;

an inlet into the housing being located in one end wall of the housing;

the inlet being directed toward the inner rotor portion at a position spaced from the rotor axis in a direction toward the outer wall at a position angularly spaced from the outlet.

Preferably the second material is prevented by the inlet direction from escaping directly radially outwardly to the discharge opening.

Preferably the inlet direction is located immediately downstream of the discharge opening so that the second material passes around at least 270 degrees before reaching the discharge opening.

Preferably the outer wall includes a smooth discharge section angularly downstream of said impact surfaces extending to said discharge opening.

The improvements and advantages herein operate by using the actuators for the housing, which can contain both the chopping rotor and the weed seed destructor section, to position the housing at a first position so that all reside enters only the chopper part of the assembly relative to a second position where the residue stream is split into two streams such that only the straw stream enters the chopper part and the chaff and weed seed stream only enters the weed seed destructor system.

In each of these operational modes the rear straw hood door is capable of opening for windrowing of the straw for a future bailing operation.

Typically, a non-operable mode is also designed where the entire assembly is raised to the highest level to allow operator access to the sieves. Locking mechanisms or mechanical stops are employed in all positions to securely hold the position of the assembly desired.

In this arrangement, the weed seed destructor apparatus can be divided into a primary destructor section and a secondary destructor section where the second material is processed in the primary destructor section in a first operation and is then is removed from the primary destructor section and at least a part is transferred to the secondary to be processed in a second operation.

The transfer from the discharge of the primary to the feed inlet of the secondary can include a specific transfer duct which at least partly contains and directs the material during its transfer. The duct may be formed by containing walls surrounding the material. However at least part and optionally all of the transfer can be carried out in free space with no containing walls by the momentum in the material as it exits the discharge from the primary. The stream may also be partially confined on one or more sides. The inlet of the secondary can be formed into a larger target by providing some shape of funnel arrangement which catches the material in transfer and directs it into the relatively small inlet. The key point is that the material discharges from the primary and is transferred to the secondary where it is processed separately in the second step. Where the material is directed in an air stream, the primary and secondary destructors may be arranged at an angle relative to one another that the discharge and inlet lie on a straight line. This the axes of rotation may therefore be at an angle to one another rather than parallel or at right angles.

That is, in this arrangement, the primary destructor includes an outer housing wall at least partly surrounding an axis of the primary rotor which contains the second material against radially outward movement and directs the second material to a discharge outlet of said primary destructor for communication to the secondary destructor.

In one preferred arrangement, the primary rotor and secondary rotor are driven by separate shafts. However, this is not essential and by selection of suitable geometry, the concept defined above can be used where the primary and secondary rotors are both in the same shaft with one feeding partially processed material to the other.

In one preferred arrangement, the primary rotor and secondary rotor rotate about different axes. However, again this is not essential and by selection of suitable geometry, the concept defined above can be used where the primary and secondary rotors are both rotatable about the same axis.

In order that the discharge from the primary destructor can be collected and transferred to the secondary, preferably the primary destructor includes an outer housing wall at least partly surrounding an axis of the primary rotor which contains the second material against radially outward movement and directs the second material to the discharge outlet for communication to the secondary destructor.

In one preferred arrangement, the primary stator is of a simplified construction relative to prior art devices and comprises a plurality of impact surfaces at or adjacent the outer housing wall. This can provide a primary impact arrangement for an initial process step without complex annular rings of impact bars of the type used in the prior art. In this arrangement preferably the impact surfaces of the primary stator are arranged at angularly spaced positions around the axis and at an angle to a tangent to the outer housing wall. That is preferably the impact surfaces each comprise two simple flat surfaces arranged in a V-shape converging to an apex parallel to the axis. This arrangement has been found to generate back and forth impacts on the seeds between the inclined stator surfaces and the surfaces of the rotor blades.

In one preferred arrangement, the discharge outlet defined by the housing wall extends outwardly from an opening at an angularly confined portion of the outer housing wall. In this way the material rotates typically only around the axis with the rotor over an angle less than 360 degrees to move to the outlet which is coplanar with the rotor.

However alternative arrangements using different geometry can be used for example as shown in the above patent where the material after processing moves axially for collection and transfer to the secondary destructor.

In one preferred arrangement, the primary rotor and secondary rotor have axes parallel and offset and the transfer duct carries the discharge from the primary destructor in a direction transverse to the axes.

In one preferred arrangement, the feed inlet of the secondary destructor feeds the discharge in a direction transverse to a radial plane of the axis of the secondary rotor so as to enter the secondary destructor into its housing from one end of the secondary rotor. In this arrangement preferably the transfer duct carries the material radially along an outside of a housing of the primary destructor and then axially into a housing of the secondary destructor.

In one preferred arrangement, where the primary rotor and secondary rotor are driven by separate shafts, preferably one shaft drives one component of the combine harvester and the other shaft drives another component of the combine harvester.

For example, the shaft of the primary rotor can drive a rotary transfer member, typically an auger, arranged to collect the second material and carry the collected material to at least one primary rotor on the shaft. Preferably there are two primary destructors one on each end of the auger flight. An arrangement of this type is shown in the above US patent and is incorporated herein by reference.

For example, the shaft of the secondary rotor can drive a component of a straw management system of the combine harvester. This component can be a straw chopper of the type located at the rear of the combine harvester, or it may be an internal chopper or beater acting on the straw within the body of the combine, or it may be the shaft of a powered spreader.

In one preferred arrangement, the primary destructor includes two primary destructor components with one on each side of the combine harvester and the secondary destructor includes two secondary destructor components with one on each side of the combine harvester and each primary component feeds discharge to each respective secondary component. However other arrangements are possible. There may be different numbers of primary and secondary destructors. In this way two or more primary destructors may feed a single secondary. In this way, a single primary may feed two or more secondary destructors. While the location of these components on respective sides of the combine and thus at respective ends of drive shafts is advantageous, other arrangements can be provided. For example, either the primary or the secondary or both can be arranged so that the rotors rotate about upright axes and be located behind the sieve at a position independent of the straw management system. In this way the destructors can be driven independently of the straw management system. One important advantage herein is that the separation of the destructor mill into primary and secondary components allows the construction of each to be simplified while reducing the need for fine tolerances. This advantage can be used in many different geometries, drive arrangements and locations of the mills In one preferred arrangement, the secondary stator of said secondary destructor includes only two stator rings where an inner ring includes stator bars with spaces therebetween for passage of the material and an outer ring is defined by an outer secondary housing wall at least partly surrounding an axis of the secondary rotor which contains the material against radially outward movement and directs the material to a secondary discharge outlet of the secondary destructor. That is the above concept allows not only the construction of the primary destructor to be simplified but also the secondary can also be a simple two ring construction.

In this arrangement, preferably the secondary stator comprises a plurality of impact surfaces at or adjacent the outer housing wall. Preferably the impact surfaces of the secondary stator are arranged at angularly spaced positions around the axis and at an angle to a tangent to the outer housing wall. These impact surfaces can be similar to those of the primary as set out above where the impact surfaces of the secondary stator comprise two surfaces arranged in a V-shape converging to an apex parallel to the axis.

The weed seed destructor section can be of many different types. Examples can include:

the arrangements shown and described herein;

U.S. Pat. No. 8,152,610 (Assignee: GRDC| Inventor: Harrington| 2008) details a large and heavy weed seed destructor mill which is mounted on a mobile frame, powered by a separate engine and is pulled behind a combine harvester. The mill is made with two counter rotating rotors. Chaff and weed seeds are collected from the combines sieves and blown from the harvester to trailing unit. The chaff and weed seeds enter the center of the rotating rotors and pass through the multiple counter rotating rings causing damage and devitalization to any seeds in the chaff. The residue is then spread out behind the trailed unit.

WO 2014/127408 (Applicant: GRDC Inventors: Berry/Saunders 2014) disclosures a further development that was made following the GRDC machine discussed above. However, unlike the machine discussed above, it discloses a weed seed destructor unit which is mounted on the combine harvester behind the sieves. The weed seed destructor mill has a circular array of stationary bars positioned at an angle to the rotation of a rotor, such that there are blunt hits (i.e. impacts) to deflect seeds back into the rotation of the rotor while the seeds and the chaff pass through the destructor. The residue passes through multiple rings of stationary and rotating bars which inflict damage on any seeds in the chaff. The residue is then spread out to the sides of the harvester.

AU 2016/903873 (Applicant: Seed Terminator Holdings Inventor: Berry 2016) discloses a multistage hammer mill. Like the above it is mounted on the combine harvester behind the sieves. Rather than multiple rings of a circular array of stationary bars positioned at an angle to the rotation of a rotor it incorporates multiple rings of screens. Like a hammer mill, the rotor grinds, shears and impacts any seed in the chaff until it can pass through the screen aperture. The residue passes through multiple rings of stationary screens and rotating bars which inflict damage on any seeds in the chaff. The residue is then spread out to the sides of the harvester.

AU 2016/050802 (applicant: Tecfarm Inventor: Lewis 2016) discloses two parallel rotors with blunt flails radially extending on each rotor. It is shown that the effective tip diameters of the blunt flails are close to or intersecting each other. The rotors turn in opposing directions such that the tip velocity causes an impact zone between or near the intersecting flail tips and thus devitalization of seeds in the chaff occurs in this zone. The patent discloses the seed destruction device on a separate trailed unit however it is known that Tecfarm has mounted this type of destructor mill on a combine harvester at the rear end of the sieves.

The disclosure of each of the above cited patent documents is incorporated herein by reference. The concept herein can be used in any weed seed destructor design which uses a rotating body. In some cases the rotating body cooperates with a stator. The stator can include bars which deflect the seeds as they pass between the bars. The stator can include surrounding surfaces which cause the seeds to bounce back into the path of the rotor. In some cases the rotating body cooperates with another rotating body.

Typically the stator bars lie in a line parallel to the axis so that the apexes are directly parallel to the rotor axis. However the stator bars can be inclined to the line parallel to the axis at the cylindrical surface so that they are all tilted to the left or right. Where the bars are parallel to the axis, typically the second and third legs lie in an axial plane of the axis of the rotor.

Preferably the width of the first leg in the cylindrical surface is in the range 10 to 20 mm. Preferably the spacing between each bar and the next at the cylindrical surface lies in the range 10 to 50 mm. The width of the first legs relative to the spacing between the trailing edge of each bar and the apex of the next controls the amount of material which is allowed to escape between the bars. Increasing the length of the legs and/or decreasing the spaces increases the amount of material which remains inside the stator and thus increases the number of impacts and the power requirement for moving the material. Conversely the power can be reduced by increasing the proportion of space to leg but with consequent reduction in impacts and hence reduction in seed destruction. These ratios can be selected depending on the amount and type of seeds to be treated.

While the dimensions of the second and third legs in the outward direction have little effect on the operation, typically the width of the second leg in the outward direction is in the range 10 to 20 mm.

Preferably the outer edge of each of the second and third legs lies in a common imaginary cylinder surrounding said cylindrical surface as this makes the manufacture of symmetrical stator bars by bending sheet metal strips a more effective method.

Preferably the stator bars extend along a full height of rotor so that the height of the stator matches that of the rotor. However stators can be stacked one on top of another where the rotor is of increased height.

Preferably the legs of the stator bar comprise portions which are flat as this allows a simple bending of a flat strip to form the bars.

Preferably each of the stator bars comprises a sheet metal plate which is bent to form the legs. However other materials and methods of manufacture can be used.

Preferably the stator construction includes a stator support member and a plurality of angularly spaced stator portions mounted on the support member where the stator support member is cylindrical so as to surround the axis of the rotor and the stator portions are part cylindrical with each of the plurality of stator portions extending around a part only of the periphery of the support member. Each such portion includes a plurality of the stator bars.

This construction of separate replaceable stator portions allows a plurality of the stator portions to be provided having different characteristics which can be selected for different weed seed sizes and amounts. The selection of the portion also can be used to change power requirements.

In particular, the different characteristics or the portions to the used in any circumstance relate to the length of the first leg of the stator bars around the axis and/or the spacing between the stator bars around the axis.

This construction of part cylindrical stator portions allows the portions to be hard surface coated as a separate component from the support member.

Preferably there are provided rotor components between the inner and outer stators.

Preferably the rotor comprises a hub carrying rotor blades defining the rotor surfaces. In some cases the blades are pivotally mounted about an axis parallel to the rotor axis so as to act as flails. However the blades may also be fixed. More specifically, the blades of the primary are preferably fixed as they need to accelerate green or wet residue, where if the blades were pivoting they would swing by the green wads and tend to plug. Once the residue has been accelerated in the primary, the arrangement can utilize flails in the secondary.

Preferably the rotor comprises a plurality of blades where an outer surface of each blade has a leading edge which is closest to the cylindrical surface and tapers away from the cylindrical surface toward a trailing edge.

The user can set a predetermined balance between the seed kill rate and power requirements, both of which are dependent on the number of impacts and thus the ratio of the openings to bars in the stator.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
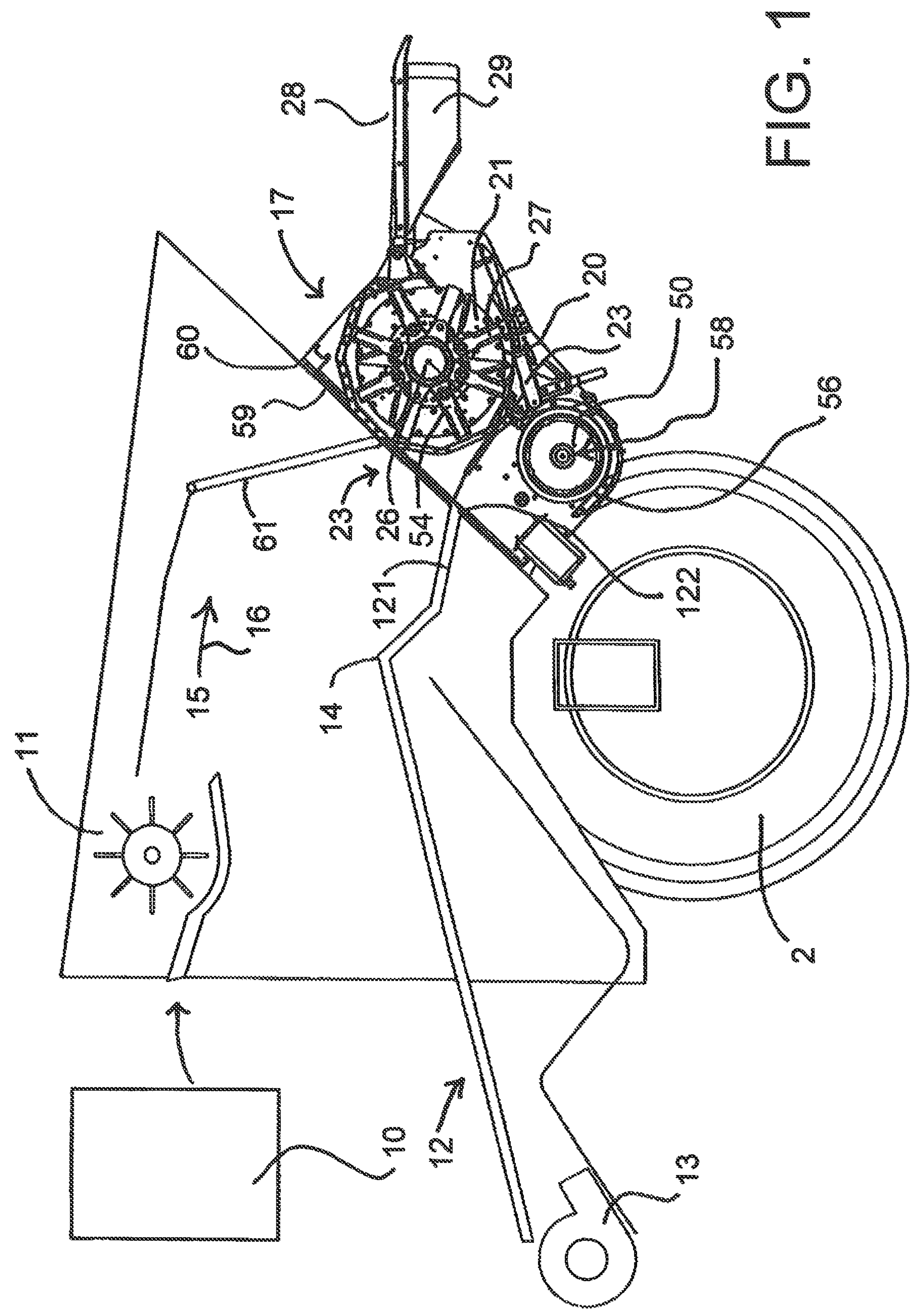
FIG. 1 is a cross-sectional view of a part of a first embodiment of combine harvester including an apparatus for management of straw and weed seeds according to the present invention showing the components in a first mode of operation.

The apparatus herein is shown in FIG. 1 mounted on a combine harvester 1 carried on ground wheels 2 and including harvesting components 10 of a conventional nature. This can include in some current embodiments a conventional separator with straw walkers with a threshing cylinder having an axis perpendicular to the direction of travel (not shown). In other embodiments using an axial separator with a rotor axis aligned with the direction of travel there may be provided an internal chopping rotor or discharge beater 11 perpendicular to the direction of travel. Other arrangements are also possible.

In most embodiments, the rearmost part of the separation system is the sieve 12 with a fan 13 which allows passage through the sieve of harvested seeds for collection and discharges chaff and discarded seeds including weed seeds over and to the rear edge 14 of the sieve 12 defining a second location for the chaff.

Thus the separation system including the threshing system 10 and the cleaning system defined by the sieves 12 operates for separating harvested crop into a first material comprising straw and a second material comprising chaff and weed seeds.

The sieve 12 is mounted as is conventional for reciprocation along its length backward and forward so as to provide the required separating action in conjunction with the airflow from the fan. Thus components connected to the sieve also move in the same reciprocating movement.

The combine harvester includes the beater or straw chopper rotor 11 which completes a further and final separation before the first material containing the straw is discharged from the separation system at a first location 15 for the straw into a straw path 16 for passage to a discharge from the combine harvester.

The combine harvester as shown includes a chopper and discharge arrangement 17. The chopper thus comprises a housing 18 defined by a top wall 19, a bottom wall 20 and two end walls 21. The end walls 21 include attachment means 22 for attachment of the housing 17 to the straw path 16 of the combine harvester 1 for discharge of straw and optionally chaff from the combine harvester into an inlet opening 23 of the housing 17. The bottom wall 20 defines a semi-cylindrical portion extending from the inlet 23 to an outlet 24 through which chopped straw and air is discharged at relatively high velocity for spreading across the field in a wide spread pattern.

Within the housing is mounted a hub 25 including a shaft 26 which is carried on suitable bearings for rotation about a hub axis at a center of the housing. The shaft can form a complete shaft body across the full width or it may be formed from stub shaft portions attached to the hub 25 at each end. Blade members 27 carried by the hub 25 sweep around within the housing to entrap straw fed through the inlet 23 and to carry the straw and air past stationary blades 28 for chopping and for discharge through the outlet 24. The stationary blades 28 are mounted on the housing 17 at a position approximately midway between the inlet 23 and the outlet 24 so that blade members 27 carried on the hub sweep between the stationary blades in a cutting action.

At the exit 24 is provided the material spreading assembly which can be the form of a tailboard 28 with guide fins 29 for receiving the chopped material and spreading the material to the rear and sides of the combine harvester. Alternately, not shown, side by side powered discs can be mounted to the underside of a tailboard to throw the residue to the rear and the sides of the combine in a spread pattern.

Figure 4:
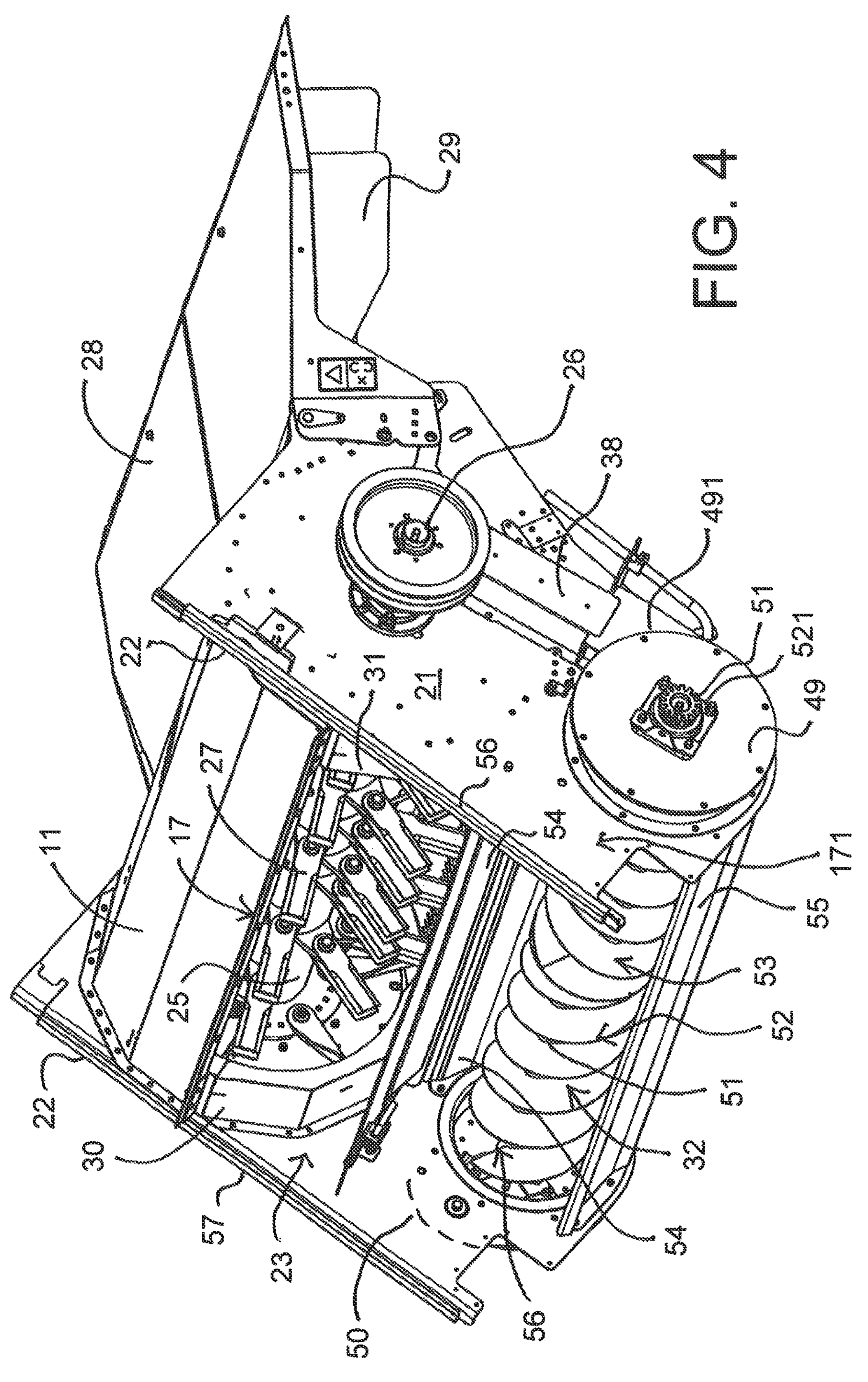
FIG. 4 is an isometric view of the straw and weed seed management system of FIG. 1 removed from the combine harvester.

In the arrangement best shown in FIG. 4 and described in more detail in the above cited PCT Publication 2020/181,385, a seed destructor is provided which includes two separate destructor components 30, 31 one on each side of the housing 17 and carried on the hub 25.

Each destructor component 30, 31 is formed by a rotor and stator mill arrangement mounted on the hub 25 which is fed by an intake arrangement 32 at the rear edge 14 of the sieve 12. The intake arrangement 32 includes an auger and blower as described hereinafter and shown in the above reference. Alternatively, each destructor component can comprise a primary destructor component at the intake arrangement 32 and a secondary destructor component connected sequentially at the hub 26, as shown in the above cited PCT published application 2023/004494. In this arrangement, the primary element acts on the chaff and weed seeds from the sieve in a first action and then the material is transferred to the secondary destructor component where a milling action is carried out to effect the necessary number of seed impacts to devitalize the weed seeds. The primary component can include impact elements or can include other devitalization elements. Alternatively the primary component as described above can be simply a fan for driving the material to the secondary destructor components for impacting.

Figure 5A:
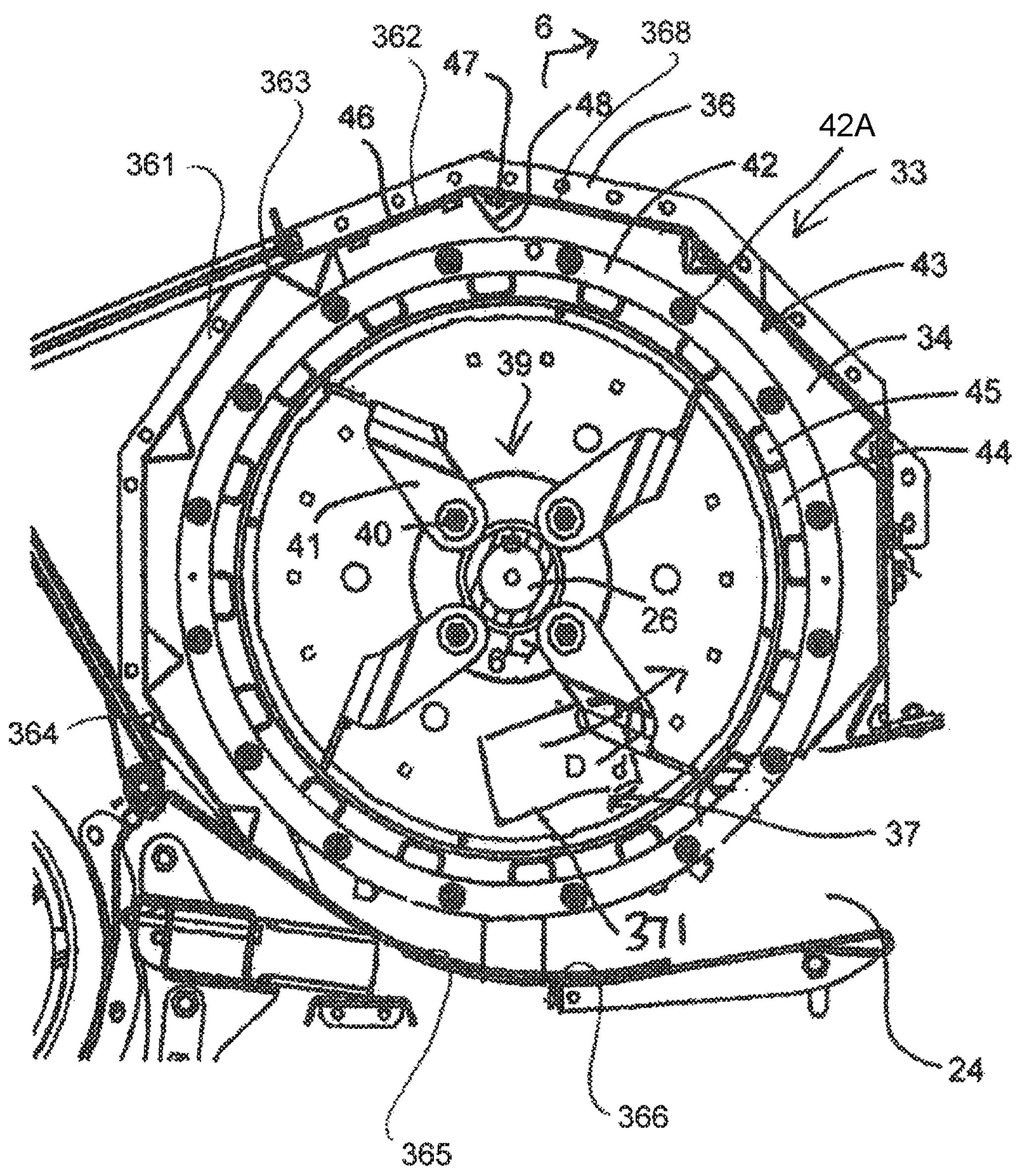
FIG. 5A is a cross-sectional view through the weed seed destructor section of FIG. 4.

Each destructor 30, 31 as best shown in FIG. 5A comprises a housing 33 with base 34 at or defined by the end wall 21 of the housing 17. The base connects to a generally cylindrical outer surface or cover panel 36. The cover panel 36 is held stationary and includes an inlet 37 for feeding the second material from a transfer duct 38 onto a rotor 39 mounted on the shaft 26 of the hub 25. Around the shaft 26 is provided a plurality of pivot pins 40 each carrying a pair of flail blades 41. In addition to the flail blades 41 is provided an outer ring 42 of pins 42A of the rotor 39 surrounding the flail blades at a position spaced outwardly therefrom and coaxial thereto.

Around the flail blades of the rotor 39 is provided a stator 43 formed by an inner annular ring 44 of U-shaped bars 45 as described in detail in the above cited reference. In addition the stator includes the inner surface 46 of the cylindrical wall 36 of the housing which is polygonal as shown in FIG. 5A with straight walls 361, 362, 368 with each pair converging to an apex 363. The wall 46 also includes V-shaped impact components 47 projecting inwardly to an apex 48. The stator cylinder 44 is carried on the stationary end wall 21 so that they project axially into the rotor. The cover forces the weed seeds to contact the stator and rotor to be impacted thereby thus devitalizing the seed.

In this arrangement the chopper includes two weed seed destructor sections 30, 31 each arranged inside the end wall 21 of the housing at the end section of the rotor. Each of these includes the rotor mounted for rotation about the axis of the shaft to engage the chaff and weed seeds fed from the location by the arrangement described hereinafter for accelerating the material in the direction outwardly from the axis to engage the stator arranged around the rotor surfaces including one or more rotor surfaces for engaging the material such that the material and particularly the weed seeds are impacted between the rotor surfaces and the stator surfaces.

The weed seed destructor apparatus thus includes the intake section 32 which includes a primary rotor components or fans 49 and 50 arranged to receive the second material. Each fan is mounted for rotation on a shaft 51 and including fan blades thereon for engaging and accelerating the second material. The primary component 49, 50 may include a primary stator mounted for engaging the weed seeds in the accelerated second material to cause a plurality of impacts on the weed seeds between the primary rotor and the primary stator.

The secondary destructors 30, 31 are arranged to receive the second material from the primary component 49, 50 and includes the secondary rotor 39 mounted for rotation about an axis and including rotor surfaces thereon for engaging and accelerating the second material.

The secondary stator defined by the inner surface of the housing 36 and the ring 44 is mounted for engaging the weed seeds to cause a plurality of impacts on the weed seeds between the secondary rotor and the secondary stator.

The primary components 49, 50 each have a discharge outlet 51 connected to the transfer duct 38 which communicates to the feed inlet 37 of the secondary destructor 30, 31.

The transfer duct 38 carries at least some of a discharge from the primary component so as to enter the feed inlet of the secondary destructor. It will be appreciated that in some cases a single primary may feed two or more secondaries so that only a part of the discharge is carried to a secondary.

The stator of the secondary destructor 30, 31 may thus include only two stator rings. The inner ring includes stator bars with spaces between the bars for passage of the material. The outer ring is defined by an outer secondary housing wall at least partly surrounding an axis of the secondary rotor. This wall also is closed, apart from the discharge, so as to contain the material against radially outward movement and direct the material angularly around the housing 36 to the secondary discharge outlet 24 of the secondary destructor which directs the material to the spreader 28 as previously described.

The arrangement shown is particularly effective in that the secondary destructors 30 and 31 are mounted in the chopper housing 17 without significantly increasing the width of the structure. That is the chopper rotor remains of the same width as the straw path. Only the primary components 49 and 50 and the associated transfer ducts 38 are mounted outside the width of the chopper housing. Alternatively, the fans 49 and 50 could be mounted in the same plane as the secondary destructor rotors 30, 31 so that only the transfer ducts 38 are outside the chopper width utilizing a narrow configuration and a small amount of space on the combine harvester.

Also the weed seed destructors 30 and 31 generate an air flow volume and rate somewhat similar to that of the conventional fans of the conventional Redekop chopper (of the type shown in the abovementioned patent) so that the total volume of air generated and fed onto the tail board 28 with the combined first and second materials for spreading is equal to or even greater than that of the conventional chopper. This is an advantage not only to the spreading but also to the removal of air in the cleaning ans separation systems of the combine harvester.

The secondary destructors 30 and 31 are located in the separate sections at the ends of the rotor so that they do not interfere with the conventional straw chopping action of the rotor.

The secondary destructors 30 and 31 are arranged to expel the second material into the secondary spreading device. In the embodiment shown this is the tailboard. However other arrangements may use a rotary spreading system. This can be used where the air flow is insufficient to generate the required spread such as where the straw chopping section is internal to the combine rather than the dedicated rear chopper shown.

In yet another arrangement the secondary destructor or destructors is mounted to the shaft of an internal straw chopper. In both these cases, again the second material can be collected by an auger and primary destructor arrangement but the transfer ducts extend forwardly to a location at the respective cross shaft within the combine.

In the intake section or feed section 32 is provided a horizontal transfer member 52 typically in the form of an auger flight 53 mounted on the shaft 51 extending along the feed section 32 of the housing across the combine harvester 1 which is mounted for rotation about a longitudinal axis of the shaft 51. The horizontal transfer member is shaped to carry the second material containing the chaff and weed seeds from the rear edge of the 17 sieve along the feed section of the housing to locations at the ends of the shaft at the end walls 21. In the arrangement shown and described above, the ends of the transfer member shaft 51 carry the first section of the devitalization system which can be a first mill or the fans 49, 50 to carry the material to the main devitalization sections 30, 31 at the rotor 26.

The arrangement shown and described herein is used in a method where the destructor components cause devitalization of the weed seeds in destructor housing so as to reduce a number of the weed seeds that can germinate. This is preferably done by impacts as described herein and shown in the previous cited patents but can use other devitalization methods.

Figure 2:
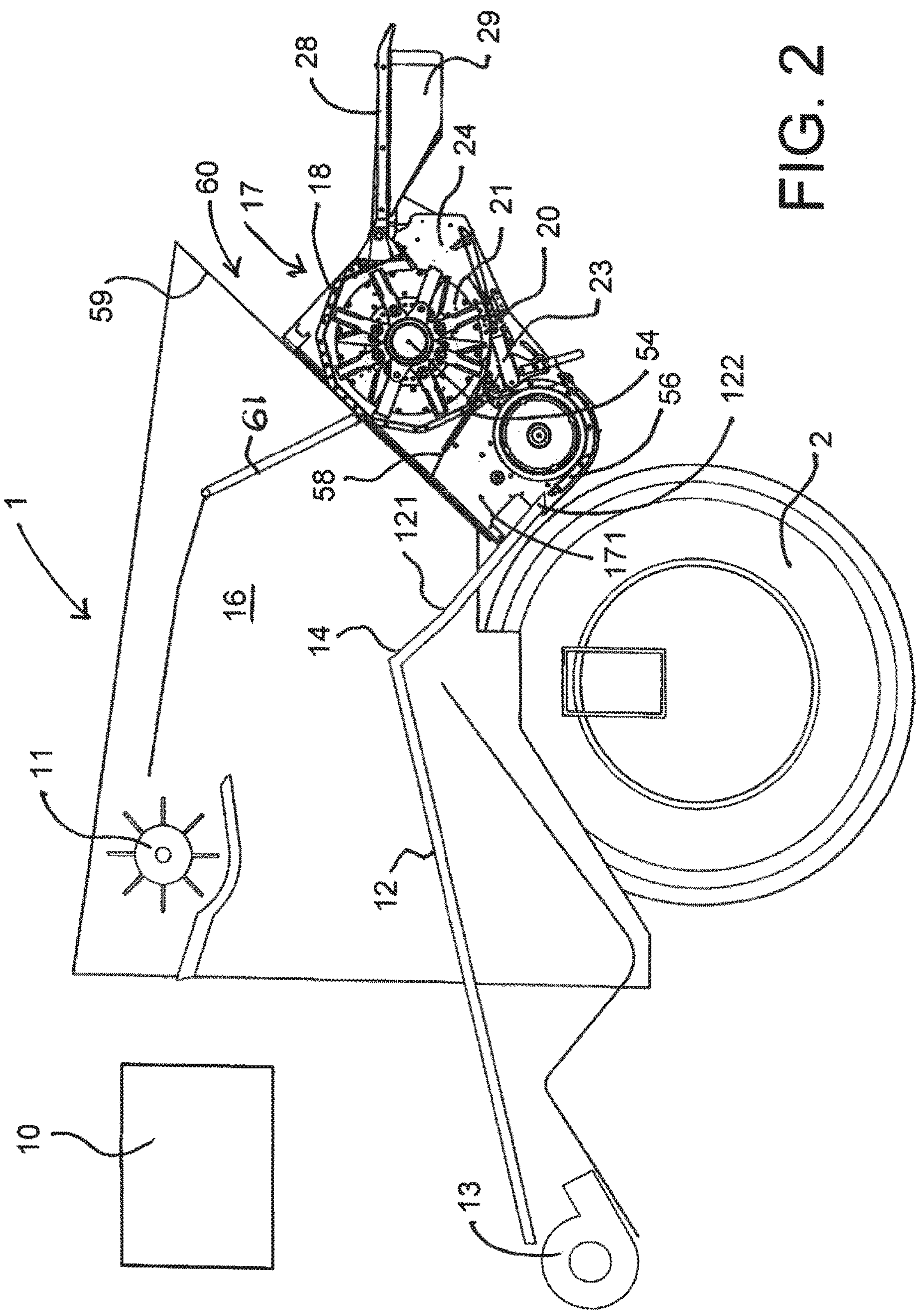
FIG. 2 is a cross-sectional view of the first embodiment of FIG. 1 showing the components in a second mode of operation.
Figure 3:
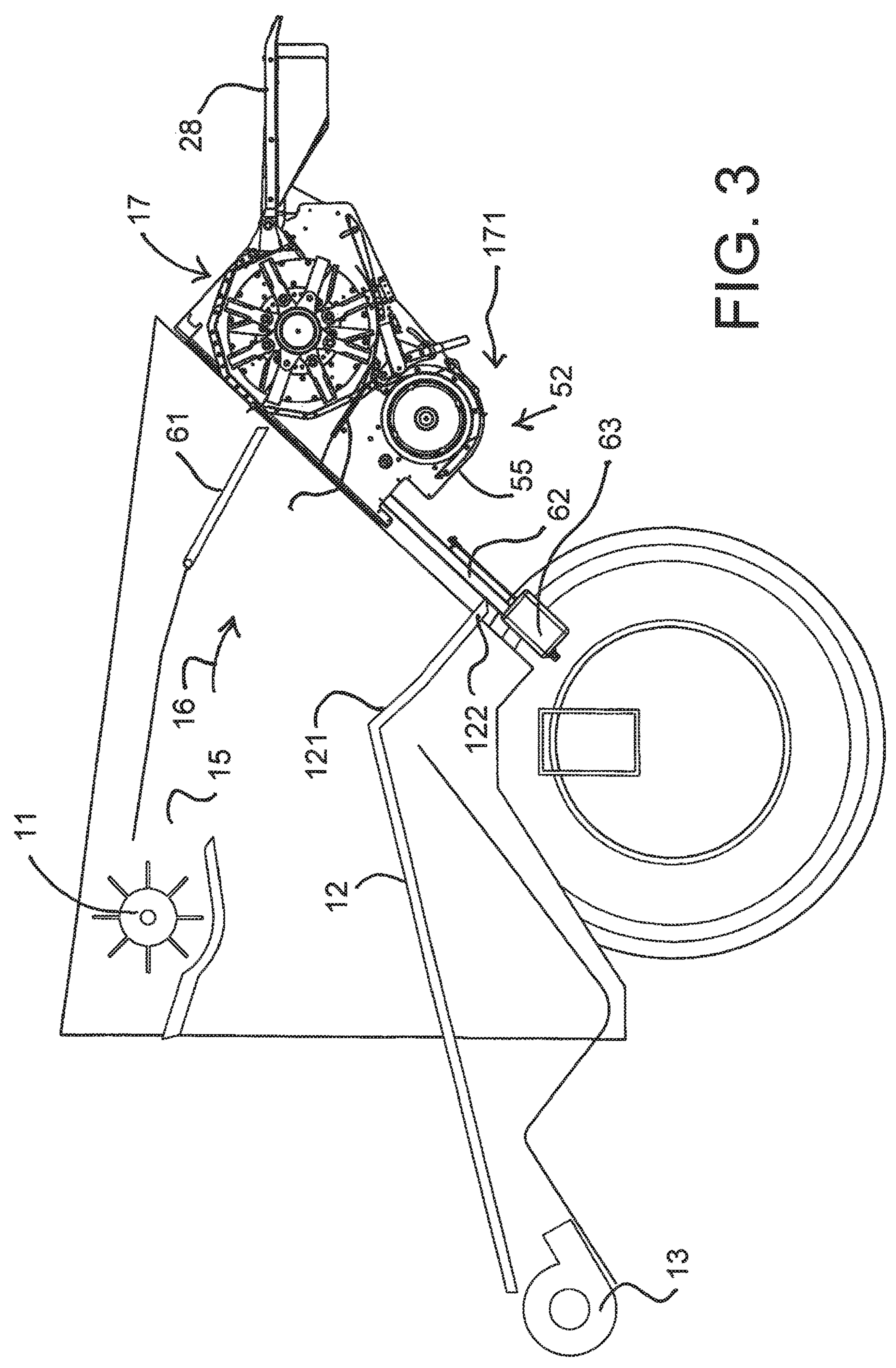
FIG. 3 is a cross-sectional view of the first embodiment of FIG. 1 showing the components in a service position allowing the user to access the combine internals.

As best shown in FIGS. 1 to 3, the chopping rotor 25 including the shaft 26 and the blades 27 carried thereon is mounting in the housing 17 which forms a common structure with the housing section 171 containing the transfer member 52 on the shaft 51. The common housing 17, 171 has common end walls 21 with a dividing wall 54 between the chopping rotor housing 17 and the transfer member housing 171. A front wall 55 of the housing 171 thus forms with the dividing wall 54 a trough 56 within which the transfer member 52 runs to carry the material from the end of the sieve to the two ends of the trough at the fans 50, 51.

The common housing 17, 171 has at the top edge of the end walls 22 a slide track 56, 57 which cooperates with a slide receptacle 58 on the rear wall 59 of the combine harvester. The rear wall 59 extends upwardly and rearwardly from a position at the rear of the sieve 12 to an upper discharge opening 60.

Thus at least the intake section, including the housing 171 and the transfer member and fans 50, 51, is moveable relative to the combine harvester 1 and the first and second locations 14, 15 thereon between first and second operating positions shown respectively in FIGS. 1 and 2.

In FIG. 1, in the first operating position or mode, both the first material comprising straw from said first location 15 and said second material comprising chaff and weed seeds from said second location 14 at the rear end of the sieve is directed to the chopping rotor 17 for common chopping action and common spreading on the tailboard 16. Thus both materials enter through the inlet 23 to the chopper section above the dividing wall 54 and below a top door 61 which forms a rear straw hood door above the chopping rotor which can be opened for windrowing of the straw. In this position a sieve extension portion 121 extending from the rear end 14 is located so as to be aligned at its rearmost end with the dividing wall 54. In this way the material exiting the sieve at the end 122 is fed onto the top of the dividing wall 54 and into the chopper.

In the second operating position or mode shown in FIG. 2 obtained by sliding the common housing upwardly on the guide track, the first material comprising straw from said first location 15 is directed to the chopping rotor housing 17 and the second material comprising chaff and weed seeds from said second location 14 is directed to the intake and transfer section 52 of the weed seed destructor section at the housing component 171. In this way the dividing wall 54 is moved upwardly and sieve extension portion is moved downwardly so that the straw in the upper stream 16 enters the chopper housing 17 and the chaff in the lower stream enters the intake housing 171. The straw stream is guided by the door 61 to pass under the top wall 19 into the inlet 23. The rear extension of the sieve carries the chaff to the lower wall 55 to enter the trough 56. A dividing guide wall not shown can be provided to keep the materials in the two streams separate and/or to keep the straw up in the upper stream to prevent the straw from entering the trough 56. Thus a divider wall can be moved or inserted and acts to keep the materials separated.

As shown therefore the chopping rotor 17 in the housing 9 is moveable relative to the combine harvester in conjunction with movement of the weed seed destructor section. Thus the chopping rotor 17 is connected to the weed seed destructor section for common movement therewith in the common housing. Thus the chopping rotor 17 is moveable relative to the combine harvester between said first and second operating positions.

The movement of the housings to the two operating positions shown in FIGS. 1 and 2 does not interfere with the escape of all material over the door 61 for discharge through the opening 60 for windrowing in conventional manner.

In view of the arrangement of the guide track, the weed seed destructor section and the chopping rotor is movable in a direction upwardly and rearwardly of the combine harvester. Thus the movement may include only the intake section 52, may include both the intake section and the weed seed destructor mills or as shown may include both of these components and the straw chopper as a common housing 17, 171.

In order to assist in carrying the straw to the straw chopper, a conveyor arrangement can be provided along the straw path 16 so as to convey at least some of the straw between the first location 15 and the entry 23 into the chopping rotor housing 17. Such a conveyor or guide if provided has a width across substantially the full width of the combine to carry the material from the location 15 to the inlet 23.

Thus the sieve extension 121 can act as a guide sheet and acts for guiding the second material from the end of the sieve at the location 14 across the width of the sieve. In FIG. 1 in the first operating position, the guide sheet 121 is located at a position communicating with the dividing wall 54 between the upper and lower sections 17, 171 of the common housing. In FIG. 2 in the second operating position, the guide sheet 121 is moved or is located at a bottom wall 55 of the lower section 52 so as to communicate with the bottom wall of the housing portion 171. This guide sheet can be movable by adjustment of support components (not shown). In some cases it can be removable when not required. In effect, the guide sheet 121 comprises a movable extension portion of the sieve 14 of the combine harvester.

As shown in FIG. 3, the weed seed destructor section defined by the common housing sections 17 and 171 is moveable relative to the combine harvester by an actuator 62 driven by a motor 63 which drives the housing between the first and second positions. This actuator can also move the housing to a third position separate from said first and second operating positions at which there is a space between the bottom wall 55 of the housing of the weed seed destruction section and the rear end 14 of the sieve 12 for access to the location between the wall 55 and the sieve for servicing. In this position there is no communication of the straw and chaff to the housings as this is intended to be a non-operating position provided only for service.

Figure 5B:
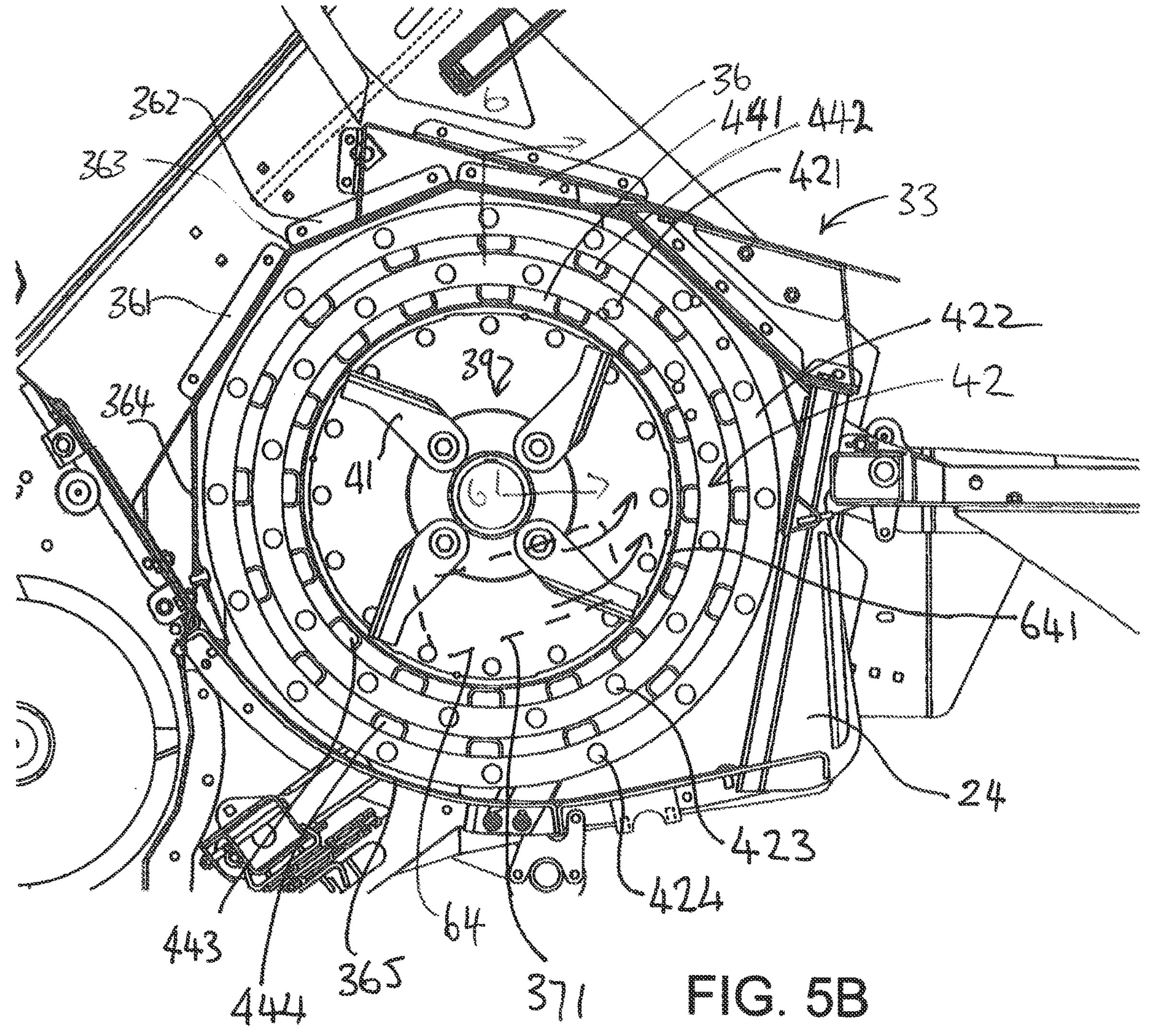
FIG. 5B is a cross-sectional view through an alternate embodiment of the weed seed destructor section of FIG. 4.
Figure 6:
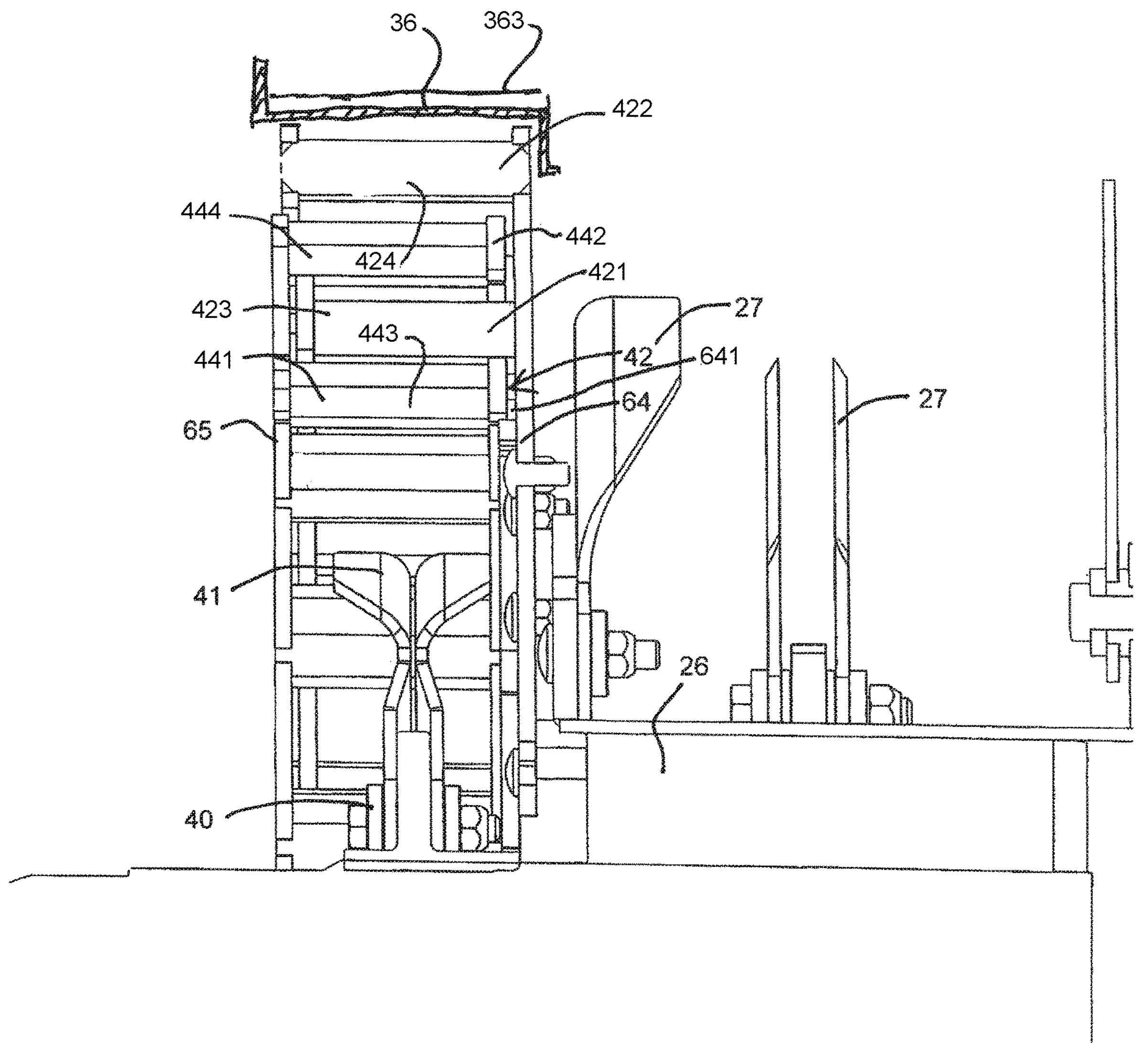
FIG. 6 is a cross-sectional view along the lines 6-6 of FIG. 5B.

Turning now to FIGS. 5A, 5B and 6, the construction of the weed seed destructor mill on the rotor shaft 26 is shown in more detail and comprises the rotor 39 and a stator 43. The rotor comprises the inner blade section defined by the fan blades 41 and at least one outer coaxial ring 42 of rotor members or pins 421.

As shown in FIG. 5B the second destructors can be made with rotors fabricated of two upstanding rings of pins and three stators; two rings of stator bars and an outer surface designed to reflect the chaff and weed seeds back into the outer rotor pins for further seed destruction. The bars are spaced each from the next to allow the material to pass between.

Thus as shown in FIGS. 5B and 6 there are two coaxial rings 421 and 422 of pins 423 and 424. This embodiment thus provides three rotor sections 41, 421 and 422 each for impacting the seeds as the chaff moves outwardly through the stator 45. The rings 421 and 422 are mounted on a support plate 64 defined by the chopper side wall at the inner end of the mill.

In FIG. 5A, the stator 45 comprises one ring 44 of stator members 45 mounted on a support plate 65 at the opposed end or outer end of the mill.

In FIGS. 5B and 6, an alternative arrangement is shown where there are two rings 441 and 442 of stator members 45. The first ring 441 of stator members surrounds the inner blade section defined by the blades 41 and a second ring of stator members 441 is located between the inner 421 and outer 422 coaxial rings of rotor pins 423, 424 so that the outer coaxial ring 422 of rotor members forms the outer ring of the mill within the outer wall 36. As described above, the outer wall 36 in FIG. 5A also carries impact members 48 projecting inwardly from the outer wall.

In FIGS. 5B and 6, the outer wall 36 does not include any inward projections but is formed from surfaces which are planar sections 361 and 362 which converge to an apex 363 facing outwardly. These surfaces define tangential sections and are therefore different from a smooth cylinder surrounding the outer ring of rotor pins. The planar surface portions 361, 362 thus form sections which cause the seeds moving outwardly between the rotor pins and swept around the axis angularly to impact on the surfaces as they change from one surface to the next at the apexes 363. This adds another series of impacts without having another ring of stator bars outside the rotor ring 422. Thus the ring 422 is the outermost ring and acts to provide an improved rotation on the material to increase velocity at the exit 24. After the last planar surface 364, the wall 36 forms a smooth curve with no changes of direction to sweep the material to the exit. The exit surface 365 as it approaches the discharge 24 at portion 366 thus is smooth and gradually increases in radius from the rotor axis so as to form a spiral exit.

Thus in the embodiments of both FIGS. 5A and 5B the outer wall 36 includes a plurality of wall portions 361, 362, 368 connecting edge to edge to form a continuous peripheral surface over which the material can be swept from the location at which the material reaches the outer wall around the outer wall to the exit 24. Between each wall portion and the next is thus provided a change in direction at the apex 364 to cause weed seeds to engage the next portion and cause the seeds to leave the outer wall and move inwardly from the direction change. Thus a balance is obtained between the requirement to provide additional impacts while allowing the material to move effectively to the exit. While the outer surface does not include in FIG. 5B any impact bars, it does provide sufficient impacting effect to cause the weed seeds to return back into the outer ring of rotor pins. Thus on each surface 361, 362, 368 the material moves outwardly along the surface from the mid point of the surface close to the rotor pins toward the apex 363 before it reaches the change in direction at the apex 363. Thus there are no significant inwardly projecting projections which would interfere with the angular flow of the material over the outer wall to the exit.

The inlet 37 from the transfer duct 38 enters though the end wall 21 and as shown in FIGS. 5A and 5B is directed generally axially toward the inner rotor section 41 at a position spaced from the rotor axis but also inclined toward the outer wall 36 along a direction D at a position above the outlet 24. The side walls 371 of the inlet 37 are thus inclined upwardly to a position above the outlet 24. In this way the material is prevented or inhibited from escaping directly radially outwardly to the exit 24 but instead is inclined toward the rotor and stator components at a position angularly spaced from the exit 24. In this way the material is introduced into the interaction between the rotor and stator for impacting back and forth over the angle of around 270 to 300 degrees from the top of the exit 24 around the outer wall 36 to the portion 365 where it is carried outward to the exit 24. The introduction of the material in this direction ensures a large angle sweep of the material as opposed to introduction in an axial direction which could allow some material to move radially outwardly directly from the blades 41 and see little impacts.

The provision of the outer most ring as the ring 422 of the rotor pins 424 thus ensures that a strong rotary force is applied to the material as it leaves the mill and runs around the inner face of the housing 36. This increases movement and can reduce plugging. Also the arrangement using only four rings 41, 422, 441 and 442 provides a construction which is of reduced diameter. This allows the structure to match the diameter of the chopping rotor. Also this reduced diameter reduces the area taken up by the mill which can have advantage in many designs.

However this construction using reduced numbers of rings with the outermost ring being part of the rotor provides the possibility of escape of weed seeds before they have achieved sufficient impacts to obtain devitalization.

In order to avoid or reduce the possibility of seed escape, the outer coaxial ring 422 of rotor pins 424 contains longer members 424 as indicated at 427 than the inner ring 421 with an outer support ring attached thereto such that the outer support ring prevents escape of weed seeds from the outer ring of stator members.

In addition there is provided a sealing ring 641 on the rotor plate 64 at a position to prevent escape of weed seeds from the inner ring 441 of stator members.

In this arrangement as described above, the weed seed destructor mill is mounted on a shaft of the chopping rotor for common rotation therewith. This can comprise a single mill or more preferably a first and a second weed seed destructor mill is mounted on respective ends of a shaft of the chopping rotor for common rotation therewith. As an alternative, the destructor mill can be of the conventional type which includes two side by side upstanding mills each on a respective side of the center line of the combine harvester. This construction is shown in later figures as an alternative.

Turning now to FIGS. 7 to 11, there is shown in further detail the sieve extension 70 which can be used to attach to the rear end of the conventional sieve 12. The sieve extension can be used in conjunction with the movable housing 17 as described above to assist in separating the material into the required housing sections or can be used as an alternative arrangement where the housing 17 is held fixed and the change in mode obtained by the arrangement of sieve extension described herein.

The operation of the sieve 12 which cooperates with the fan to separate the grain from the chaff and lighter weed seeds is well known known and includes openings in the sieve which allow air from the fan to pass so that heavier grain falls through for collection and remaining material including chaff and weed seeds floats over the sieve for discharge from the rear end.

In this arrangement there is added to the rear edge of the conventional sieve a sieve extension 70. This includes side walls 71 which support the structure and are bolted to the rear end of the sieve at connection points 72. A first rubber seal 121 is provided on each side of the sieve to seal relative to the side wall of the combine. A second seal 711 is located on each side wall 71 to seal to the combine side walls so as to fill the space necessary between the metal parts to accommodate the sieve reciprocation which is also transferred to the sieve extension which is attached to the sieve. A first section 75 of the extension 70 extending from a front edge 76 across the full width of the sieve and rearwardly to a rear edge 77 forms an imperforate plate so that no air flow passes from the fan with a plurality of longitudinally extending transversely spaced upstanding ribs 78 for guiding the material rearwardly as the extension portion oscillates back and forth with the sieve. Beyond the rear edge 77 of the portion 75 is provided a perforated transfer surface which can be a plate 79 with an array of relatively large holes 80 over the full width of the plate through which any grain which passes over the plate 75 can fall. This acts therefore to allow any unseparated grain remaining in the chaff to drop through on to grain loss sensors 81 in a collection area 82. In conventional operation of the combine harvester these sensors provide a running indication of the amount of grain loss and hence the accuracy of the combine settings. The grain loss collection area 82 includes a collection pan 83 leading to a guide wall 84 extending downwardly and rearwardly. The perforated transfer surface 79 can be formed in many different ways such as a set of fingers over which the material passes.

At the rear of the plate 79 is provided an imperforate portion 86 of the plate 79 which extends rearwardly and downwardly to a rear edge 87. A guide wall 88 is connected to the rear edge 87 of the plate 79 by a hinge 89 so as to be pivotal about the hinge which defines a transverse axis across the combine at the rear edge 77 so that the guide wall 88 can pivot upwardly and downwardly to move a rear edge 50 of the guide wall 48 upwardly and downwardly. The guide wall is imperforate and extends across the full width so that chaff passing over the rear edge 77 of the wall 75 is carried by the guide wall to a location determined by a rear edge 90 of the guide wall 88. The hinge is provided by a pair of side pins 791 which are carried on the axis of the hinge and project outwardly beyond the ends of the panel or door 88 into the side wall 71.

The lower edge of the door 88 is fastened to the side wall 71 at each of its two positions 881 and 882 by retractable pins so that the user can simply move the door to the required position and insert the pins into the location in the side wall to hold the lower end in place. It will be appreciated that the forward and rearward movement of the sieve causes forward and rearward movement of the hinge 79 and hence the door 88 is continually pivoting around the latching pins 881.

Figure 7:
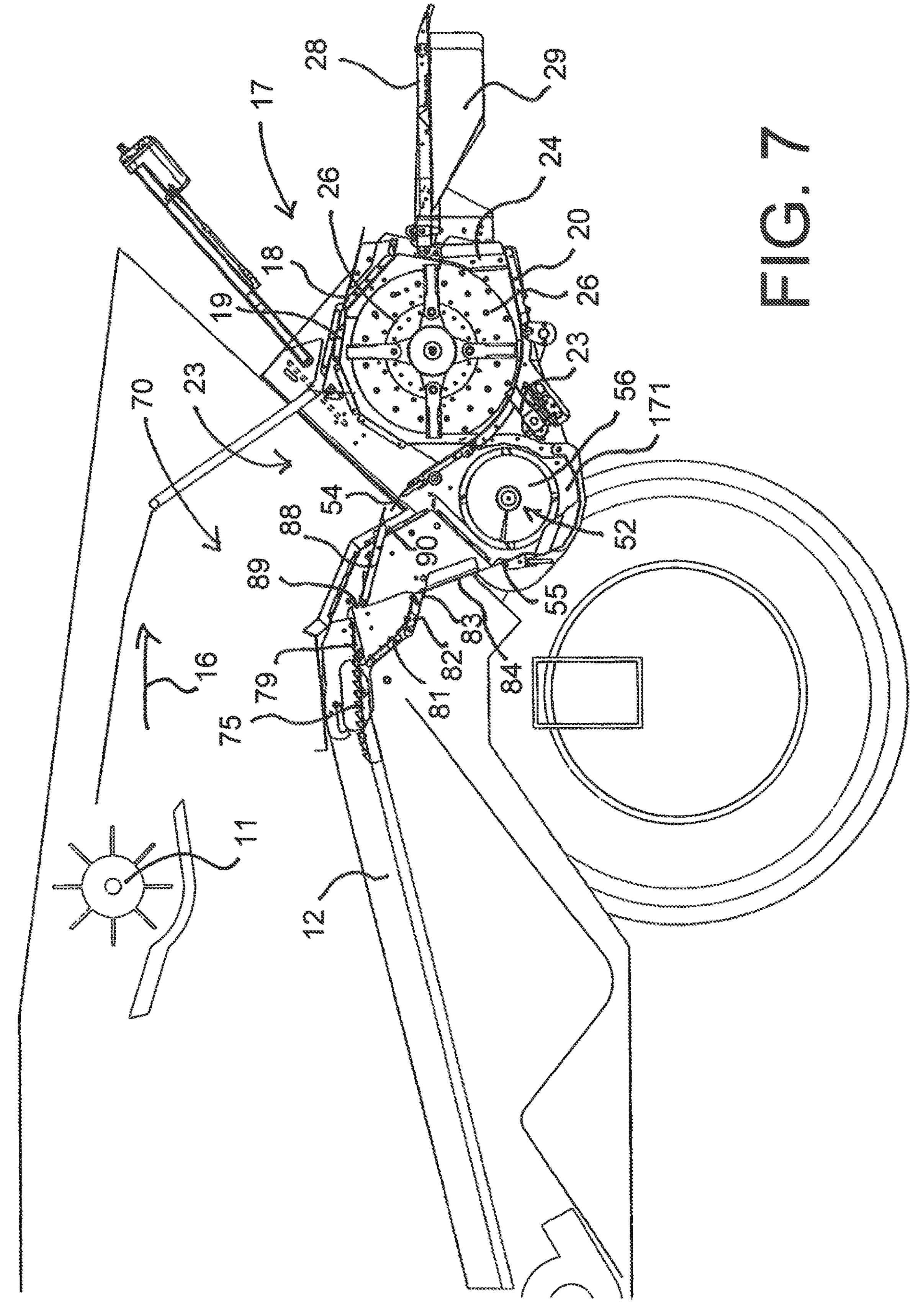
FIG. 7 is a cross-sectional view of a part of a second embodiment of combine harvester including an apparatus for management of straw and weed seeds according to the present invention showing the components in a first mode of operation.
Figure 8:
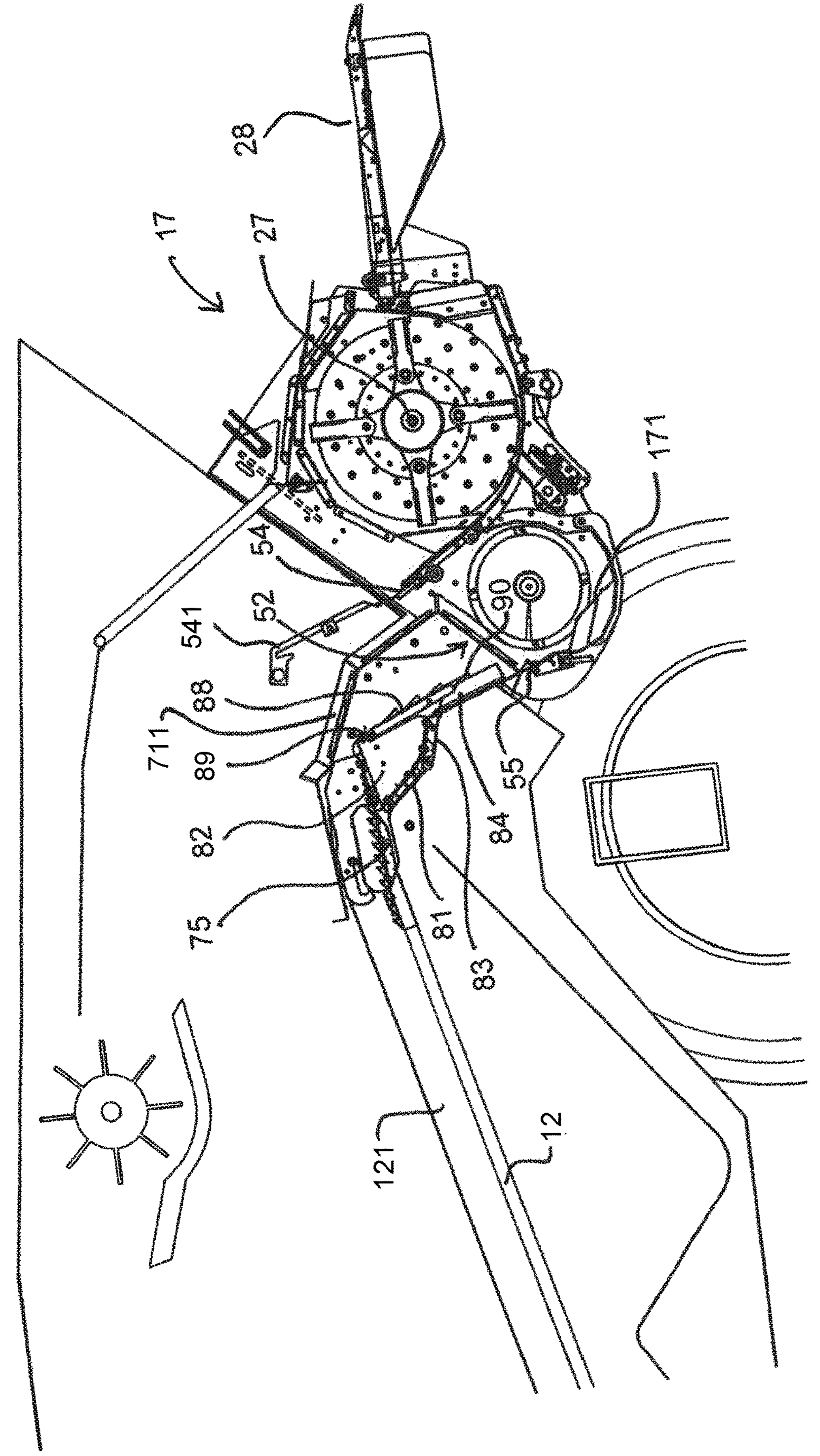
FIG. 8 is a cross-sectional view of the second embodiment of FIG. 7 showing the components in a second mode of operation.

As best shown by comparing FIGS. 7 and 8, the weed seed destructor section includes a housing 171 which collects and guides the chaff and weed seeds to the devitalization system, typically a rotating mill arrangement. In this arrangement, the housing includes a generally cylindrical feed section 52 with an entrance opening at least partly across the rear end of the sieve 12 with a leading edge of the entrance opening defined by the wall 55 and a trailing edge of the entrance opening defined by the wall 54.

Figure 9:
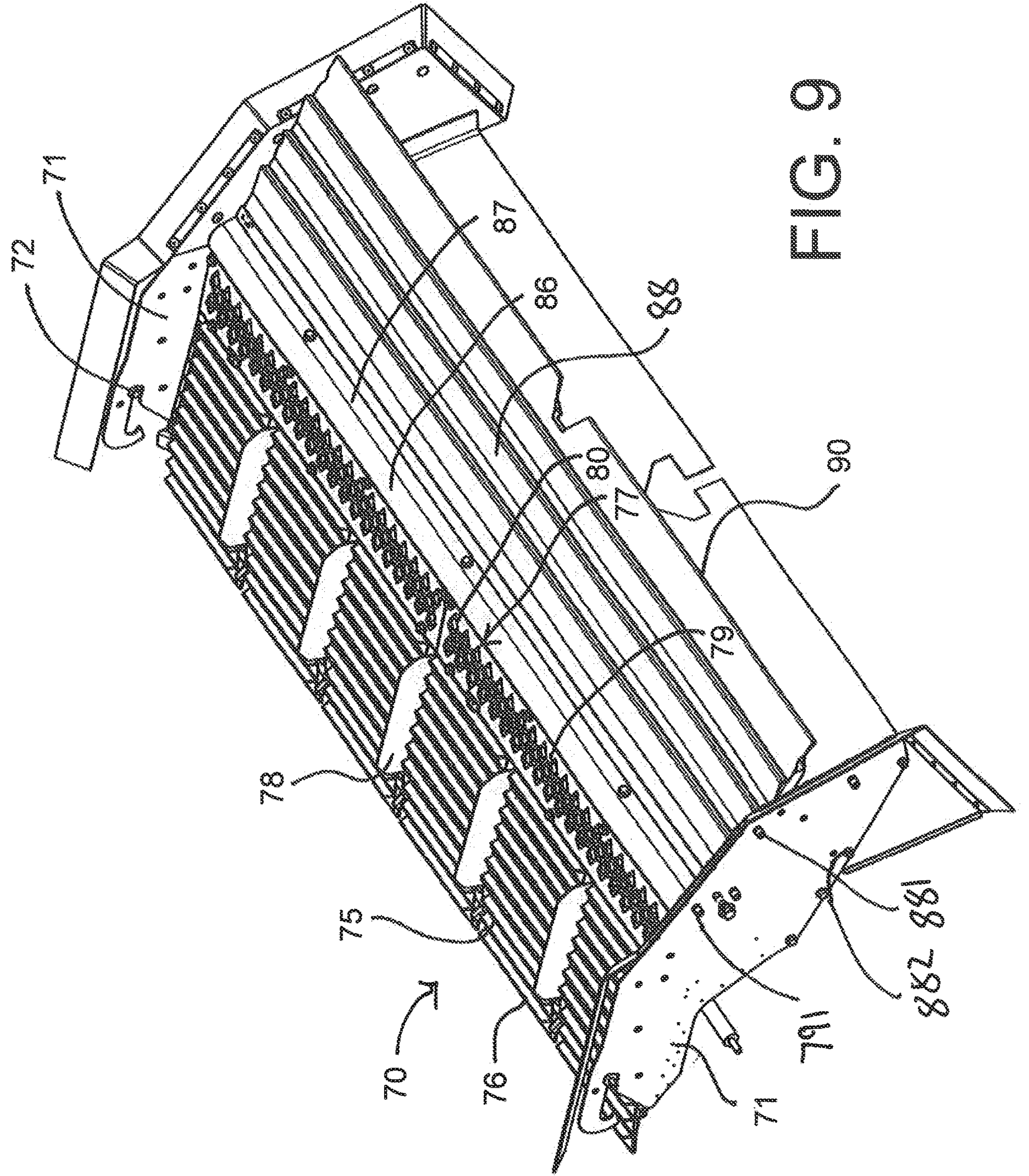
FIG. 9 is an isometric view of the sieve extension system of FIG. 7 removed from the combine harvester in the first mode.

The guide wall 88 pivots so that a rear edge 90 thereof is located at the leading edge 54 in the first mode shown in FIGS. 7 and 9 to direct the chaff and weed seeds into the inlet 23 of the chopping rotor to operate in the first mode above.

Figure 10:
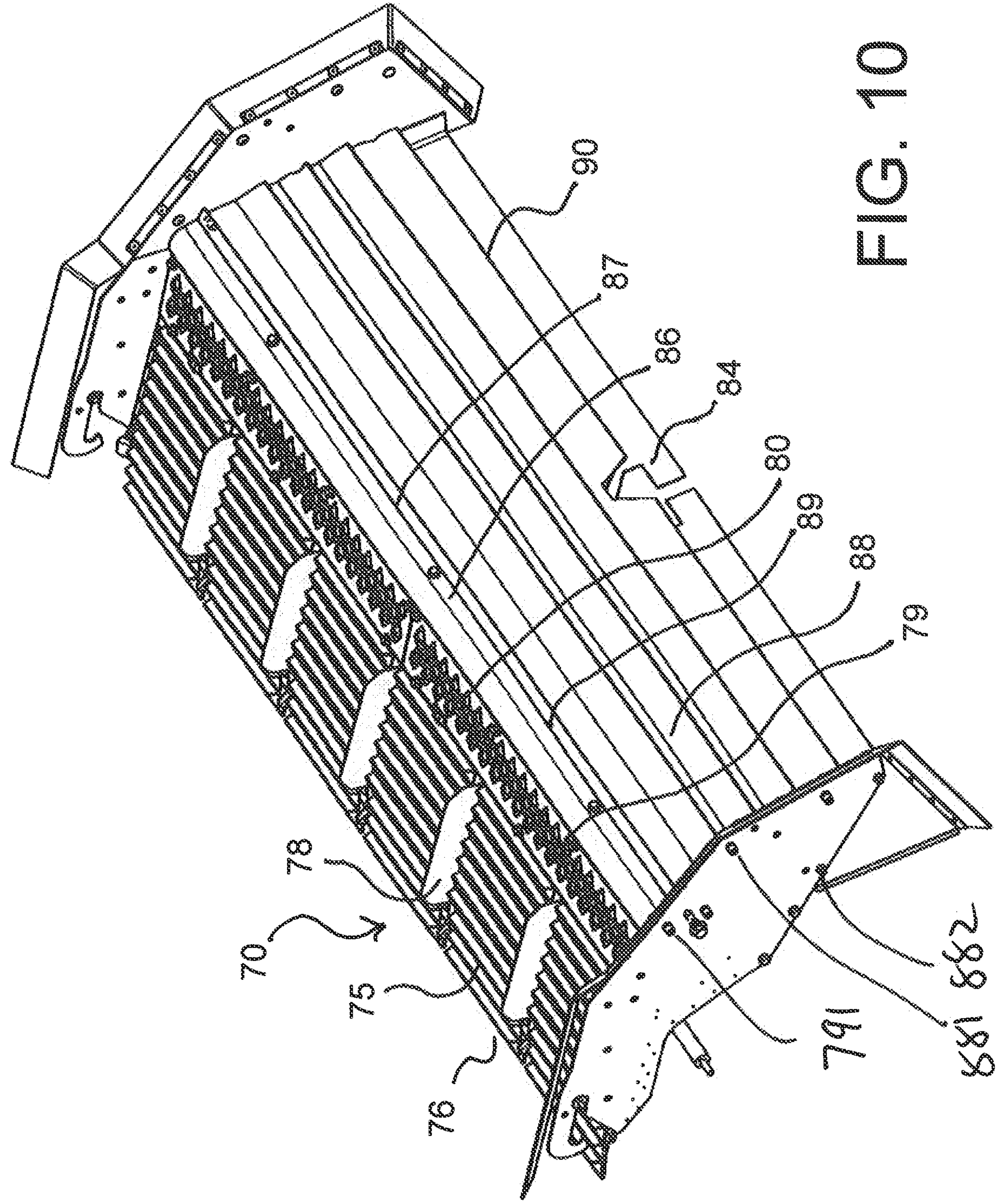
FIG. 10 is an isometric view of the sieve extension system of FIG. 7 removed from the combine harvester in the second mode.
Figure 11:
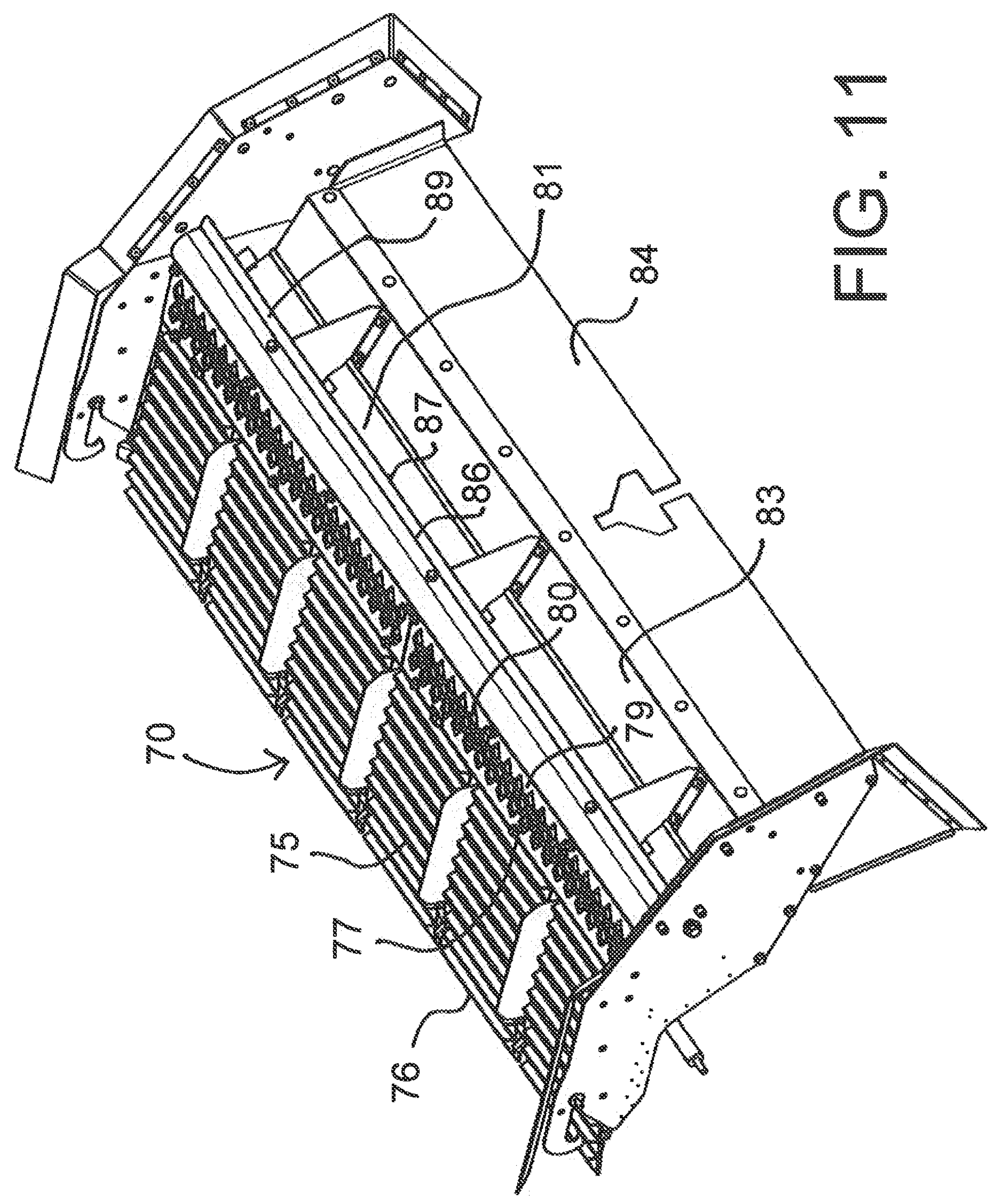
FIG. 11 is an isometric view of the sieve extension system of FIG. 7 removed from the combine harvester where the guide door is removed to show the grain loss collection section.

In the position shown in FIGS. 8 and 10 the rear edge 90 is moved so that it is located at the leading edge 55 in the second mode to direct the second material including chaff and weed seeds into the feed section 52 of the weed seed destructor section while the straw passes over the guide wall 88 into the chopper inlet 23. Pivoting at the leading edge of the guide wall 88 allows an actuator (not shown) to move the guide wall 88 while the combine is harvesting without fear of material collecting on the leading edge 89 of the guide wall 88, creating a plugging situation. Allowing the operator to remotely actuate the guide wall 88 either by control switch or controlled by an electronic weed map allows the use of the weed destructor only when needed, saving the farmer costs and increasing harvest throughput.

As shown in previous patents, the method includes two modes where the chopping rotor and weed seed destructor section are operated in a first operating mode in which both the first material comprising straw from the first location and said second material comprising chaff and weed seeds from the second location is directed to the chopping rotor. In the second mode the chopping rotor and weed seed destructor section are arranged such that the first material comprising straw from said first location is directed to the chopping rotor and the second material comprising chaff and weed seeds from the second location is directed to the weed seed destructor section.

The conversion from first to second mode is obtained very simply by moving the guide wall 88 engaging and directing at least the second material to change between said first and second modes. The guide wall 88 has a leading edge 89 attached to the extension portion of the sieve by the hinge 89 and extends rearwardly therefrom. The guide wall 88 is thus pivotal about its leading edge between the modes.

In the position shown in FIG. 8 where the chaff is fed to the inlet of the WSD, an additional panel 541 is provided at the dividing wall 54 spanning the inlet and extending upwardly from the top edge of the wall 54 into the path of the chaff to ensure that the chaff is restricted from passing to the chopper. The panel 541 is preferably a removable panel which can be stored at a suitable location and moved into place when the door 88 is moved to the first position. Suitable mounting points can be provided on the side walls of the combine harvester.

Figure 12:
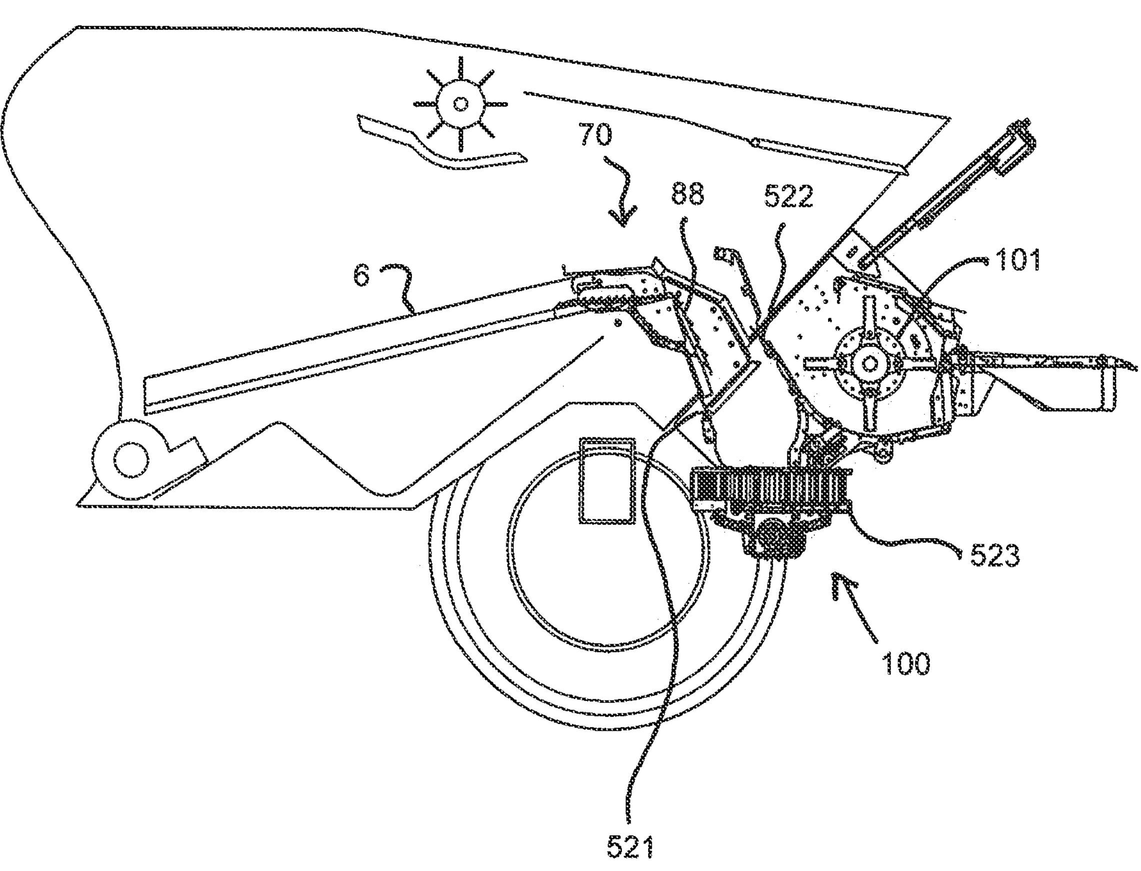
FIG. 12 is a cross-sectional view of a part of a third embodiment of combine harvester including an apparatus for management of straw and weed seeds according to the present invention showing the components in a first mode of operation.

As shown in FIG. 12, another mode of operation can be provided where door 61 is opened, the chaff and weed seeds are fed to the transfer section while the straw is caused to bypass the chopper over the chopper through a rear door for collection in a windrow.

As described above, the sieve includes a main body 12 with a rear edge 14 of the main body at which is mounted the sieve extension portion 70 extending rearwardly from the rear edge 14 so that the guide wall 80 is mounted with its leading edge attached to the sieve extension portion 70 by the hinge 89.

As previous explained there is a grain loss collection pan 82 collecting grain which is unseparated by the sieve in a grain loss section at a rear end of the sieve. This collected grain is transferred by the guide surface 84 from the grain loss section to the intake 52 of the weed seed destructor section at the housing section 171. In this way the collected grain from the grain loss system, in all operation modes, which is to be discarded is also sent into the devitalization system so as to cause devitalization of the collected grain so as to reduce a number of the grains that can germinate when discarded to the ground behind the combine.

As shown in FIG. 4, the seed destructor section defined by the transfer member 52 includes a drive disengagement feature 521 or clutch on the shaft 51 operable electrically to halt transfer of the material and thus to halt the devitalization. In this way the grain from the grain loss sensor section 83 can be collected in the housing 171 for inspection, that is collected in the trough below the auger.

As shown in FIG. 4, the housing including the housing 171 of the transfer section 52 and the chopper housing 17 are formed as a common housing unit commonly mounted on the combine by the mounting so as to be slidable along the rear of the combine from the operating position shown in FIGS. 1 and 2 to a retracted access position where the housing 51 is moved away from the sieve to allow the worker to access the sieve for adjustment or service.

As shown in FIG. 12 there is provide an embodiment where the arrangement shown in FIGS. 7 to 11 is used in conjunction with a conventional weed seed destructor system which includes two parallel upstanding mills 100 cooperating with a conventional straw chopper 101 as previously described. A sieve extension 70 is provided with a hinged door 88 which moves between the two positions at the leading 521 and trailing edges 522 of an inlet 523 to the two mills 100.

Alternately door 54 is also moveable to align with sieve extension hinged door 88, giving chopper entry 23 the widest possible opening when in chopper only mode.

Alternately, weed seed devitalization occurs in the transfer mechanism behind the sieve.

Alternately the weed seed destruction section is mounted separately from the straw chopper section.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combine harvester comprising;

a separation system for separating harvested crop into grain, a first material comprising straw at a first location and a second material comprising chaff and weed seeds at a second location; and a weed seed destructor section comprising:

a rotor rotatable about a rotor axis;

a stationary stator around which the rotor rotates to cause impacts of the weed seeds back and forth between the rotor and the stator;

the rotor comprising an inner rotor portion and at least one annular rotor ring portion which carries a plurality of rotor surfaces and rotates around the rotor axis outwardly of the inner rotor portion;

the stator comprising an inner annular stator ring portion which carries a plurality of angularly spaced, axially extending stator bars and is located outwardly of the inner rotor portion and inwardly of the annular rotor ring portion, each stator bar being spaced from a next stator bar by an axially extending space therebetween along a length of the stator bars with second material passing through the axially extending space;

an inlet for the second material to engage the rotor and the stator;

a discharge opening at which the second material is discharged after said impacts;

and an outer stator structure surrounding the rotor ring of the rotor;

the outer stator structure including an outer guide wall guiding the second material exiting outwardly from the rotor angularly around the rotor axis to the discharge opening;

said at least one annular rotor ring portion having openings therein through which the second material passes;

the outer guide wall being located directly adjacent said at least one annular rotor ring portion with the second material passing though the openings impacting the outer guide wall;

the outer guide wall being shaped with impact surfaces different from a cylindrical surface surrounding said at least one annular rotor ring portion.

2. The combine harvester according to claim 1 wherein said at least one annular rotor ring comprises a single outer rotor ring which defines an outermost ring of the rotor.

3. The combine harvester according to claim 2 wherein the outer wall includes a plurality of angularly extending wall surface portions at spaced positions around the axis each connected to the next so as to form the outer guide wall into a continuous guide surface around the axis, which wall surface portions are at an angle to one another so as to define a change in direction in the continuous guide surface over which the second material passes to form said impact surfaces on said outer guide wall.

4. The combine harvester according to claim 3 wherein the angularly extending wall surface portions form a straight section of the continuous guide surface upstream of the change in direction therebetween.

5. The combine harvester according to claim 3 wherein the wall surface portions define a first planar surface meeting a second planar surface at a first apex at the change in direction where the second planar surface meets a third planar surface at a second apex at the change in direction.

6. The combine harvester according to claim 3 wherein the outer wall defined by said wall surface portions is polygonal in cross section.

7. The combine harvester according to claim 1 wherein the discharge opening is located in the outer guide wall for discharge of the second material after said impacts and wherein the inlet comprises an inlet duct having duct walls directing the second material along a direction path defined by the duct walls which is inclined to the rotor axis and directed toward the outer guide wall at a position angularly spaced from the discharge opening.

8. The combine harvester according to claim 7 wherein direction path defined by the duct walls impinges on the outer wall at a location immediately downstream of the discharge opening.

9. The combine harvester according to claim 1 wherein the outer wall includes a smooth discharge section angularly downstream of said impact surfaces extending to said discharge opening.

10. The weed seed destructor section according to claim 1 wherein the inlet is located in a wall generally radial to the rotor axis.

11. The weed seed destructor section according to claim 10 wherein the inlet is located in the wall at a position spaced from the rotor axis.

12. A combine harvester comprising;

a separation system for separating harvested crop into grain, a first material comprising straw at a first location and a second material comprising chaff and weed seeds at a second location; and a weed seed destructor section comprising:

a rotor rotatable about a rotor axis;

a stationary stator around which the rotor rotates to cause impacts of the weed seeds back and forth between the rotor and the stator;

the rotor comprising an inner rotor portion and at least one annular rotor ring portion which carries a plurality of rotor surfaces and rotates around the rotor axis outwardly of the inner rotor portion;

the stator comprising an annular stator ring portion which carries a plurality of angularly spaced stator bars and is located outwardly of the inner rotor portion and inwardly of said at least one annular rotor ring portion, each stator bar being spaced from a next with the second material passing therebetween;

an inlet duct carrying the second material to engage the rotor and the stator;

a discharge opening at which the second material is discharged after said impacts;

a stationary outer wall surrounding the rotor and guiding the second material exiting outwardly from the rotor angularly around the rotor axis to the discharge opening;

the inlet duct having duct walls directing the second material along a direction path defined by the duct walls which is inclined to the rotor axis and directed toward the outer wall at a position angularly spaced from the discharge opening.

13. The combine harvester according to claim 12 wherein the direction path defined by the duct walls impinges on the outer wall at a location immediately downstream of the discharge opening.

14. The weed seed destructor section according to claim 12 wherein the inlet duct is located in a wall generally radial to the rotor axis.

15. The weed seed destructor section according to claim 14 wherein the inlet duct is located in the wall at a position spaced from the rotor axis.

* * * * *